(12) United States Patent
Nolan et al.

(10) Patent No.: US 9,923,821 B2
(45) Date of Patent: *Mar. 20, 2018

(54) MANAGING COMMUNICATION CONGESTION FOR INTERNET OF THINGS DEVICES

(71) Applicant: Intel Corporation, Santa Clara, CA (US)

(72) Inventors: Michael Nolan, Maynooth (IE); Keith Nolan, Mullingar (IE); Mark Kelly, Leixlip (IE); John Brady, Celbridge (IE)

(73) Assignee: INTEL CORPORATION, Santa Clara, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/757,743

(22) Filed: Dec. 23, 2015

(65) Prior Publication Data
US 2017/0187625 A1    Jun. 29, 2017

(51) Int. Cl.
| G06F 15/167 | (2006.01) |
| H04L 12/801 | (2013.01) |
| H04L 12/26  | (2006.01) |
| H04L 29/08  | (2006.01) |

(52) U.S. Cl.
CPC .............. *H04L 47/10* (2013.01); *H04L 43/10* (2013.01); *H04L 67/12* (2013.01); *H04L 67/2842* (2013.01)

(58) Field of Classification Search
CPC ......... H04L 47/10; H04L 67/10; H04L 12/66; H04L 43/16; H04L 47/6235; H04L 49/506; H04L 67/2842; H04L 67/2852
See application file for complete search history.

(56) References Cited

U.S. PATENT DOCUMENTS

| 6,173,323 B1* | 1/2001 | Moghe .................... H04L 43/10 340/10.1 |
| 8,443,072 B1 | 5/2013 | Orback |
| 8,588,245 B2 | 11/2013 | Julien et al. |
| 9,241,451 B2 | 1/2016 | Ersavas et al. |
| 9,294,476 B1 | 3/2016 | Lurey et al. |
| 2007/0008884 A1 | 1/2007 | Tang |
| 2007/0291646 A1 | 12/2007 | Ohishi et al. |

(Continued)

FOREIGN PATENT DOCUMENTS

| WO | 2015083919 A1 | 6/2015 |
| WO | 2015150853 A1 | 10/2015 |

OTHER PUBLICATIONS

Tahir et al., "Symbiot: Congestion-driven Multi-resource Fairness for Muli-User Sensor Networks", 2015 IEEE HPCC-CSS-ICESS, Aug. 24-26, 2015, 6 pages.

(Continued)

*Primary Examiner* — Hitesh Patel
(74) *Attorney, Agent, or Firm* — Grossman Tucker Perreault & Pfleger, PLLC

(57) ABSTRACT

A method and apparatus are provided for controlling an internet of things (IoT) device based on a congestion level. An example method includes polling a sensor, writing a measurement to a file, parsing the file to create a message, and checking for a backpressure alert message. If a backpressure alert message is found the message is saved to a cache, and a polling interval is changed.

19 Claims, 17 Drawing Sheets

(56) References Cited

U.S. PATENT DOCUMENTS

| | | |
|---|---|---|
| 2011/0134936 A1 | 6/2011 | Andreoli-Fang et al. |
| 2011/0310743 A1 | 12/2011 | Kuriyan |
| 2012/0317308 A1* | 12/2012 | Penner ................ H04L 65/4092 709/239 |
| 2013/0246944 A1 | 9/2013 | Pandiyan et al. |
| 2014/0095170 A1* | 4/2014 | Roper ..................... G08B 3/00 704/274 |
| 2014/0286164 A1 | 9/2014 | Mahindra et al. |
| 2014/0304436 A1* | 10/2014 | Mortensen .............. G06F 13/10 710/18 |
| 2014/0337435 A1 | 11/2014 | Kaefer et al. |
| 2015/0098374 A1 | 4/2015 | Homchaudhuri et al. |
| 2015/0134954 A1* | 5/2015 | Walley ................... H04L 63/08 713/168 |
| 2015/0195738 A1 | 7/2015 | Zhu et al. |
| 2016/0117162 A1 | 4/2016 | Searle et al. |
| 2016/0296124 A1 | 10/2016 | Wegerich et al. |
| 2016/0321480 A1 | 11/2016 | Hamlin et al. |
| 2016/0340856 A1 | 11/2016 | Conner et al. |
| 2016/0342328 A1 | 11/2016 | Rangarajan et al. |
| 2017/0111328 A1 | 4/2017 | Leon |
| 2017/0187588 A1 | 6/2017 | Nolan et al. |

OTHER PUBLICATIONS

PCT International Search Report, PCT Application No. PCT/US2016/063909, dated Mar. 7, 2017, 3 pages.
PCT International Search Report, PCT Application No. PCT/US2016/063908, dated Mar. 8, 2017, 3 pages.
PCT International Search Report, PCT Application No. PCT/US2016/063907, dated Mar. 9, 2017, 3 pages.

* cited by examiner

MANAGING COMMUNICATION CONGESTION FOR INTERNET OF THINGS DEVICES

TECHNICAL FIELD

The present techniques relate generally to Internet of Things (IoT) devices. More specifically the present techniques relate to devices that can manage communication congestion.

BACKGROUND

It has been estimated that the Internet of Things (IoT) may bring Internet connectivity to 50 billion devices by 2020. However, this number of devices may lead to substantial crowding of communications channels between IoT devices and the coordinators or servers that are receiving the data, especially during equipment failures. The crowding of the communications channels may lead to the loss of messages from individual IoT devices, leading to incomplete data sets.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
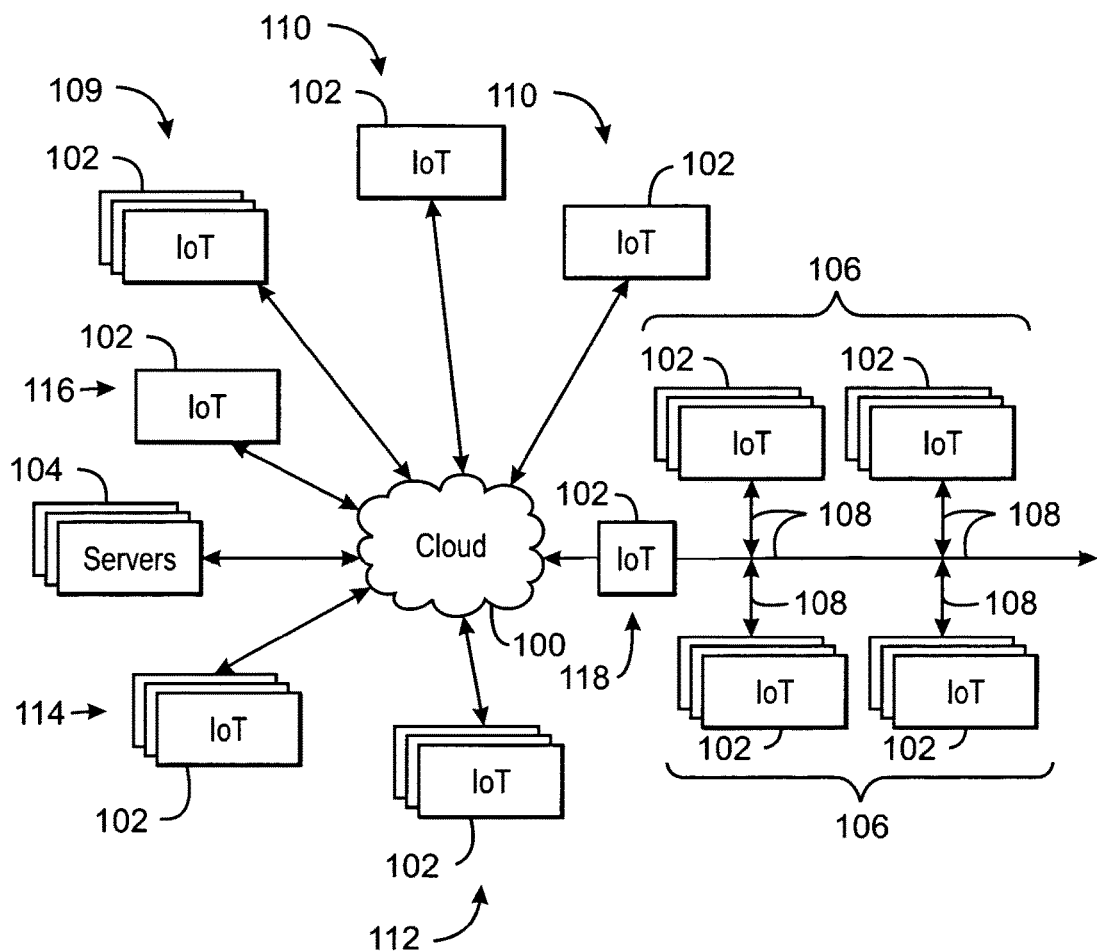
FIG. 1 is a drawing of a cloud computing network, or cloud, in communication with a number of Internet of Things (IoT) devices, at least some of which are communicating with servers.

The internet of things (IoT) is a concept in which a large number of computing devices are interconnected to each other and to the Internet to provide functionality and data acquisition at very low levels. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. Further IoT devices may include IoT gateways, used to couple other IoT devices to cloud applications.

Global deployments of IoT devices generally rely on communications to back end cloud based services. Given the scale of the underlying wireless networks involved in the global deployment of billions of IoT devices, outages and loss of network connectivity may often occur. The temporary network connectivity issues may result in the loss of valuable sensor data and may significantly increase the network load and backend server processing requirements when cached messages are dispatched or replayed.

The techniques described herein provide backend data processing pipelines with the ability to protect themselves against a data deluge following a lengthy network connectivity outage affecting part of the deployed network. Using the techniques, data processing pipelines use spare downstream message capacity to globally or individually control the rate and mode of replay for IoT gateways to significantly reduce the potential for large spikes in data processing load and pipeline congestion.

As described in examples herein, a system may calculate a congestion level and send alerts to edge devices. As used herein, an edge device may be an IoT gateway in communication with a number of IoT devices and with servers, or other devices, in a computing cloud. In some embodiments, the edge device may be an IoT device that is directly in communication with the computing cloud. Further, a computing cloud, or cloud, includes mobile phone systems, internet service providers, routers, networks, servers, and other units that transfer or consume data. The alerts can also be consumed and acted upon by any interested party, for example a pipeline statistics consumer. Any number of communication issues may interfere with the transfer of messages to the cloud, including failures in cloud based equipment, such as routers and server, among others.

Examples described herein may include a data processing pipeline with backpressure detection to identify communication issues in the cloud through congestion. Once detected, the congestion may be quantified based on service availability, throughput, and available resources. Further, a cloud to edge alert system may be used to communicate backpressure states in the cloud to an edge device, for example, to trigger a behavior change in the edge device.

The alert system may send backpressure alert messages to the edge device, or create backpressure alert messages to be accessed by the edge device, or both.

Behavior changes in the edge device may include different reporting mechanisms during times of congestion, different methods for sending data backlogs once the congestion is relieved, or both. For example, IoT gateway based message dispatch and replay mechanisms may be used to implement automatic self-adaption in relation to dynamic message caching and sensor polling decisions.

Upon receipt of a backpressure alert, sensor measurements can be cached using local resources on the edge device, e.g., IoT gateway or IoT device, using a buffer. This may occur automatically in response to a temporary overload of the available cloud resources. Further, the rate that messages are sent may be automatically adjusted, e.g., reduced or increased, depending on changes in the level of congestion. The behaviors may be implemented in response to messages from the network itself or from peer systems. For example, the system may dynamically vary the rate at which sensors are polled to measure new data and the rate that data is dispatched to the data processing pipeline in the cloud. Both the congestion rate in the cloud and the remaining local resources, e.g., the ability to cache data at the edge device, may be considered in these determinations.

Once normal operation resumes, the system may automatically process any backlog of sensor measurements which have been cached locally during the backpressure event. The measurement timestamps are preserved and the system automatically back-fills any time periods where a capacity issue prevented the real-time dispatch of measurements from the device.

Data cached on the edge devices does not have to be dispatched in the same time order as when they were obtained. The system provides a configurable method to dispatch latest data measured first, latest data measured last, or dispatch random samples of stored data. This provides flexibility to prioritize edge data, e.g., time-sensitive cached data, for improved summary calculations by backend systems.

FIG. 1 is a drawing of a cloud computing network, or cloud 100, in communication with a number of Internet of Things (IoT) devices 102, at least some of which are communicating with servers 104. The cloud 100 may represent the Internet, or may be a wide area network, such as a proprietary network for a company. The IoT devices 102 may include any number of different types of devices, grouped in various combinations. For example, a traffic control group 106 may include IoT devices 102 along streets in a city. These IoT devices may include stoplights, traffic flow monitors, cameras, and the like. The traffic control group 106, or other subgroups, may be in communication with the cloud 100 through a sub-network 108, such as a local area network, wireless local area network, and the like. The IoT devices 102 may use another IoT device 102 as an IoT gateway 118 to communicate with the cloud 100.

Other groups of IoT devices 102 may include remote weather stations 109, local information terminals 110, alarm systems 112, automated teller machines 114, and alarm panels 116, among many others. Each of these IoT devices 102 may be in communication with other IoT devices 102, with servers 104, or both.

As can be seen from FIG. 1, a large number of IoT devices 102 may be communicating through the cloud 100. Each of these IoT devices 102 may generate a time sequenced data stream including, for example, a sensor data stream. For example, the traffic control group 106 of IoT devices 102, may send traffic counts, traffic speed, images, precipitation amounts, temperature measurements, and the like. Given the number of IoT devices 102 that are sending data, the network loading may be substantial. If any problems develop in the data pipeline from the IoT devices 102, in the cloud 100, or at the servers 104, data may be out of sequence or lost.

As described in further detail herein, the network congestion may be monitored to change the functionality of the IoT devices 102, e.g., controlling the rate and sequence of data collection and transfer, herein collectively termed data transfer. This may be performed by backpressure monitoring in the cloud 100, at an IoT gateway 118, or at an IoT device 102. The backpressure monitoring in the cloud 100 may be used to generate alerts that are sent to an IoT gateway 118 or IoT device 102 to control data transfer.

Figure 2:
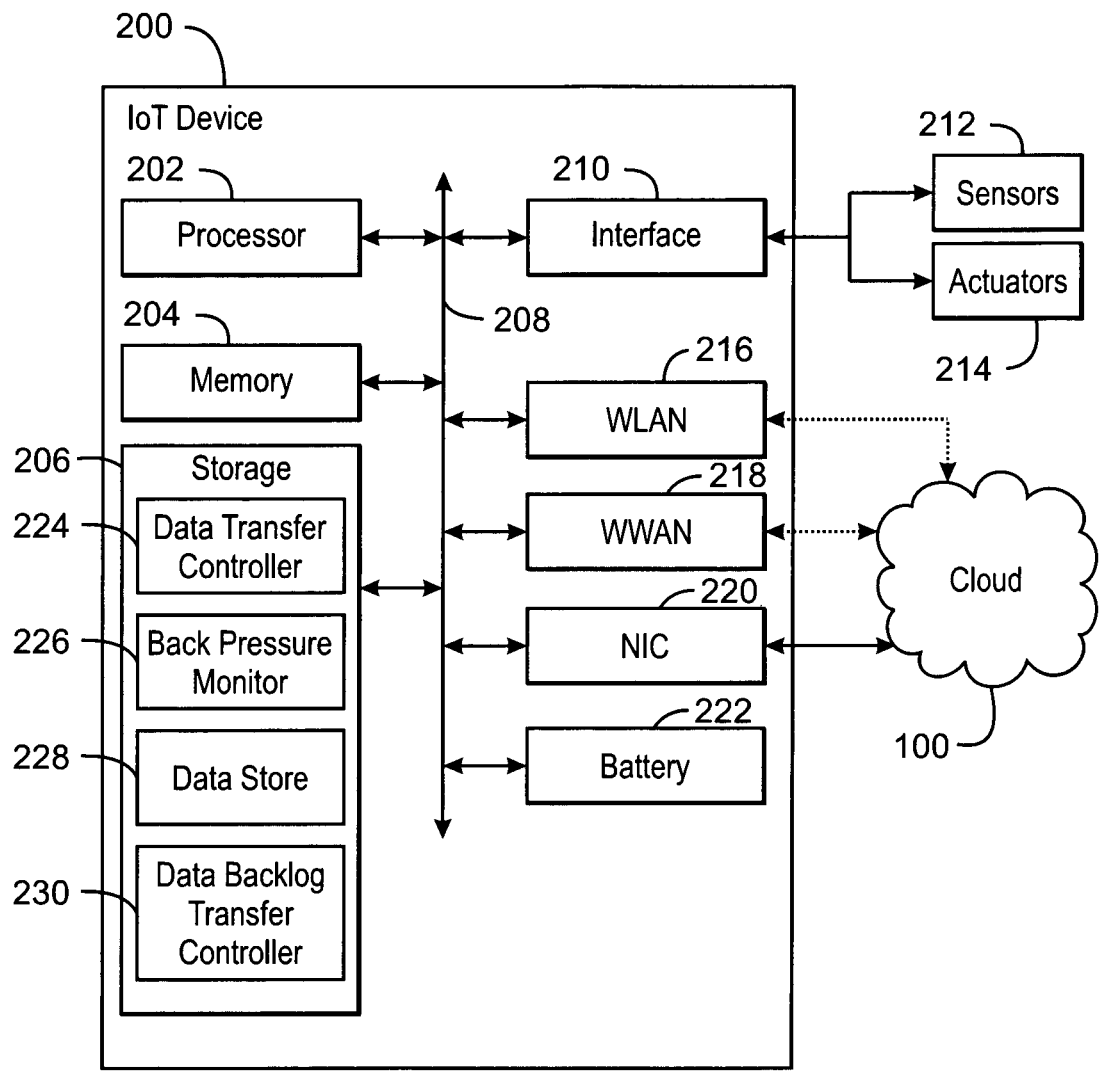
FIG. 2 is a block diagram of components that may be present in an IoT device that can respond to backpressure and control data transfer.

FIG. 2 is a block diagram of components that may be present in an IoT device 200 that can respond to backpressure and control data transfer. Like numbered items are as described with respect to FIG. 1. The IoT device 200 may include any combinations of the components. The components may be implemented as ICs, portions thereof, discrete electronic devices, or other modules, logic, hardware, software, firmware, or a combination thereof adapted in the IoT device 200, or as components otherwise incorporated within a chassis of a larger system. The block diagram of FIG. 2 is intended to show a high level view of components of the IoT device 200. However, some of the components shown may be omitted, additional components may be present, and different arrangement of the components shown may occur in other implementations. The IoT device 200 may be a traffic monitoring device, a remote weather station, a programmable logic controller (PLC) or remote terminal unit (RTU) in a SCADA (supervisory control and data acquisition) network, an alarm system device, a smart television, a cellular telephone, or any number of other IoT devices 102 as discussed with respect to FIG. 1.

As seen in FIG. 2, the IoT device 200 may include a processor 202, which may be a microprocessor, a multi-core processor, a multithreaded processor, an ultra-low voltage processor, an embedded processor, or other known processing element. The processor 202 may be a part of a system on a chip (SoC) in which the processor 202 and other components are formed into a single integrated circuit, or a single package. As an example, the processor 202 may include an Intel® Architecture Core™ based processor, such as a Quark™, an Atom™, an i3, an i5, an i7, or MCU-class processors, or another such processor available from Intel® Corporation, Santa Clara, Calif. However, other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an A5/A6 processor from Apple® Inc., a Snapdragon™ processor from Qualcomm® Technologies, Inc., or an OMAP™ processor from Texas Instruments, Inc.

The processor 202 may communicate with a system memory 204. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 206 may also couple to the processor 202. To enable a thinner and lighter system design the mass storage may be implemented via a solid state disk drive (SSDD). However, the mass storage may be implemented using a micro hard disk drive (HDD) in some IoT devices 200. Further, any number of new technologies may be used for the mass storage 206 in addition to, or instead of, the technologies described, such as resistance change memories, phase change memories, holographic memories, or chemical memories, among others. For example, the IoT device 200 may incorporate the 3D XPOINT memories from Intel® and Micron®.

The components may communicate over a bus 208. The bus 208 may include any number of technologies, including industry standard architecture (ISA), extended ISA (EISA), peripheral component interconnect (PCI), peripheral component interconnect extended (PCIx), PCI express (PCIe), or any number of other technologies. The bus 208 may be a proprietary bus, for example, used in a SoC based system. Other bus systems may be used, such as the $I^2C$ interface, the SPI interfaces, and point to point interfaces, among others.

The bus 208 may couple the processor 202 to an interface 210 that is used to connect external devices. The external devices may include sensors 212, such as traffic sensors, radar speed detectors, cameras, flow sensors, temperature sensors, motion sensors, wind speed sensors, pressure sensors, barometric pressure sensors, and the like. The interface 210 may be used to connect the IoT device 200 to actuators 214, such as traffic lights, strobe lights, valve actuators, lock solenoids, audible sound generators, visual warning devices, and the like.

While not shown, various input/output (I/O) devices may be present within, or connected to, the IoT device 200. For example, a display may be included to show information, such as sensor readings or actuator position. An input device, such as a touch screen or keypad may be included to accept input.

The IoT device 200 can communicate with a cloud 100 in a variety of manners, including wirelessly. In the embodiment shown in FIG. 2, various wireless modules, each of which can correspond to a radio configured for a particular wireless communication protocol, may be present. As seen in FIG. 2, a WLAN unit 216 may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit 218. The IoT device 200 is not limited to these types of radio transceivers, but may include any number of other radio communications equipment, such as transceivers compatible with the Bluetooth® standard as defined by the Bluetooth® special interest group, For example, the IoT device 200 may communicate over a wireless personal area network (WPAN) according to the IEEE 802.15.4 standard, among others.

The IoT device 200 may include a network interface controller 220 to communicate with the cloud 100 through an Ethernet interface. This may include communicating through a small wired or wireless network shared by number of IoT devices 200 that communicate with the cloud 100 through an IoT gateway 118, as described with respect to FIG. 1. For example, the IoT device 200 may be part of an ad-hoc or mesh network in which a number of devices pass communications directly between each other, for example, following the optimized link state routing (OLSR) Protocol, or the better approach to mobile ad-hoc networking (B.A.T-.M.A.N.), among others. The mesh network may communicate with the cloud, for example, through an IoT gateway 118.

The IoT device 200 may be powered by a local power source, such as a battery 222. The local power source may include any number of other units in addition to, or instead of the battery 222, such as solar cells or wind generators to charge the battery 222, among others.

The mass storage 206 may include a number of modules to implement the data transfer functions described herein. These modules may include a data transfer controller 224 that controls the data transfer from the IoT device 200 to a coordinator or server in the cloud 100. The data transfer controller 224 may store data that cannot be sent due to network congestion. Further, the data transfer controller 224 may work with a system controller (not shown) to adjust the rate at which data is collected from the sensors 212, for example, depending on available storage space.

Figure 6:
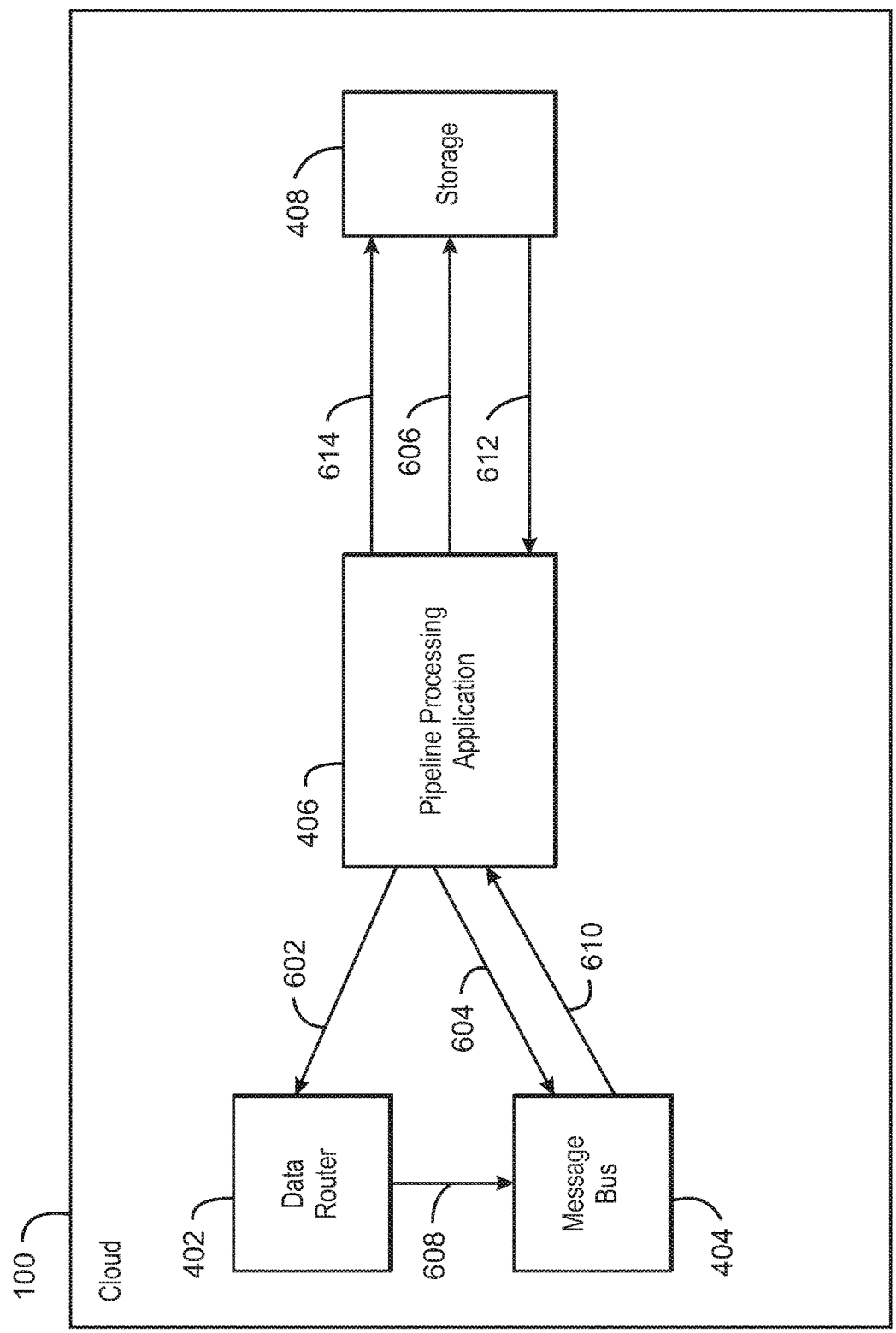
FIG. 6 is a schematic diagram of a backpressure detection system using tracer messages to measure system congestion.

A backpressure monitor 226 may determine backpressure in the cloud, for example, as determined using the tracer techniques described with respect to FIG. 6. In the case of an IoT device 200 the backpressure monitor 226 may be configured to receive backpressure alerts, e.g., messages, from backpressure monitors in an IoT gateway, in the cloud 100, or both. The backpressure monitor 226 may instruct the data transfer controller 224 to adjust the rate at which data, e.g., messages with a sensor reading and a timestamp, are sent out to the cloud 100.

A data store 228 may be used as a local buffer to hold messages that cannot be sent immediately due to network congestion in the cloud 100. The data store 228 may be used by the data transfer controller 224. In some embodiments, messages may be constructed and stored directly in the data store 228, then sent from there under the control of the data transfer controller 224.

A data backlog transfer controller 230 may transfer messages that have built up in the data store 228 during a network capacity issue. For example, instead of trying to send backlogged messages immediately upon restoration of communications, the data backlog transfer controller 230 may incrementally send the messages using a number of algorithms. These may include a last in-first out (LIFO) algorithm, a first in-first out (FIFO) algorithm, or a random sampling algorithm.

Figure 3:
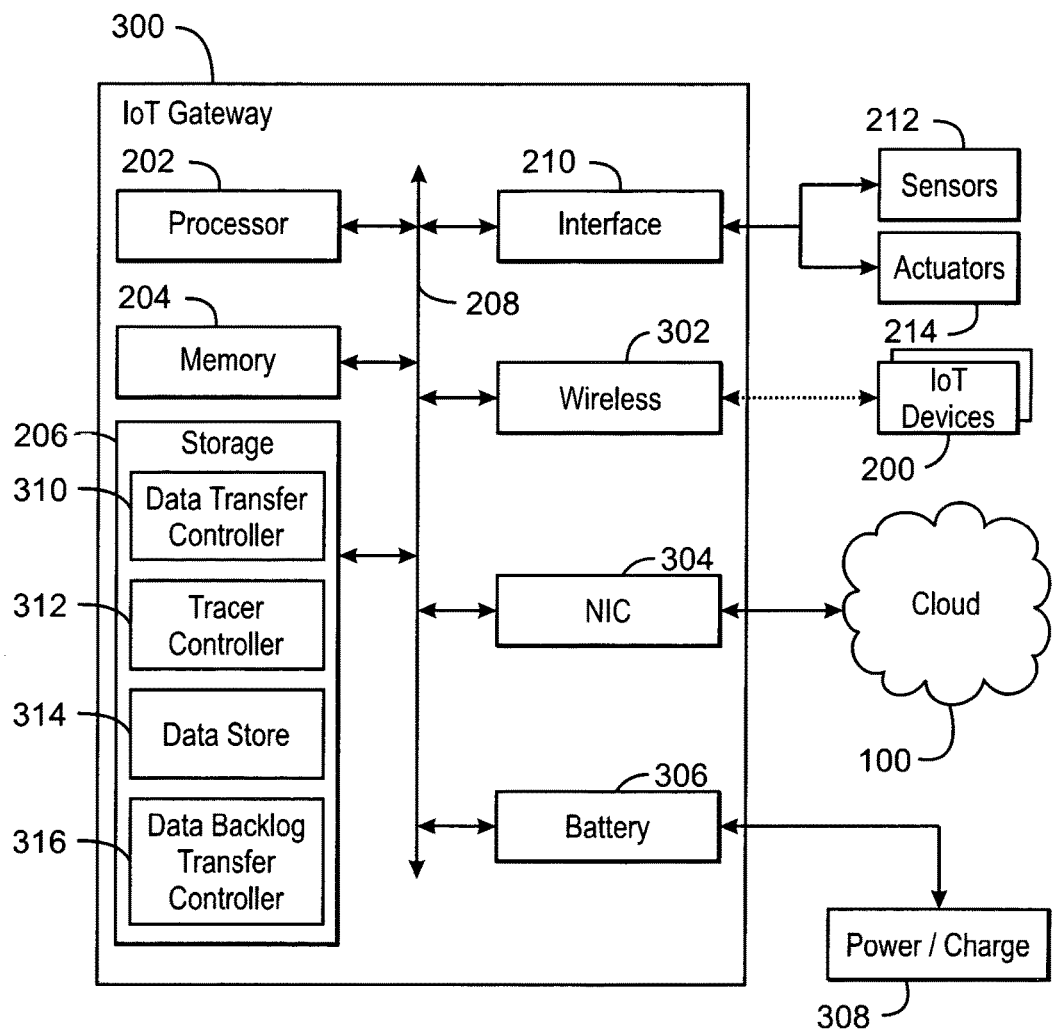
FIG. 3 is a block diagram of an IoT gateway that may be used to collect and send messages from a number of IoT devices.

FIG. 3 is a block diagram of an IoT gateway 300 that may be used to collect and send messages from a number of IoT devices. Like numbered items are as described with respect to FIG. 2. It can be understood that the IoT gateway 300 is not limited to the units shown, but may include any number of additional systems, including, for examples, sensors and actuators, WWAN systems, and the like.

The IoT gateway 300 may function as an enhanced dispatch system. For example, the IoT gateway 300 may use the techniques described herein to monitor cloud or network capacity issues. Further, the control algorithms that control caching decisions and polling decisions may be made in the IoT gateway 300.

As for the IoT device 200 of FIG. 2, the IoT gateway 300 may include any combinations of the components. The components may be implemented as ICs, portions thereof, discrete electronic devices, or other modules, logic, hardware, software, firmware, or a combination thereof adapted in the IoT gateway 300, or as components otherwise incorporated within a chassis of a larger system. The block diagram of FIG. 3 is intended to show a high level view of components of the IoT gateway 300. However, some of the components shown may be omitted, additional components may be present, and different arrangement of the components shown may occur in other implementations. Further, any of the units used may be the same or different from the units used in the IoT device 200 of FIG. 2.

While not shown, various input/output (I/O) devices may be present within, or connected to, the IoT gateway 300. For example, a display may be included to show information, such as the status of IoT devices 200 in communication with the gateway. An input device, such as a touch screen or keypad may be included to accept input.

The IoT gateway 300 can communicate with a number of IoT devices 200 in a variety of manners, including wirelessly. In the embodiment shown in FIG. 3, a wireless 302 module is used to communicate with the IoT devices 200. The wireless 302 module may include a WLAN radio, or a Bluetooth radio, among others. For example, the IoT gateway 300 may communicate with the IoT devices 200 over a wireless personal area network (WPAN) according to the IEEE 802.15.4 standard, among others.

The IoT gateway 300 may include a network interface controller 304 to communicate with the cloud 100 through an Ethernet interface. The IoT gateway 300 may be part of an ad-hoc or mesh network in which a number of devices pass communications directly between each other, for example, following the optimized link state routing (OLSR) Protocol, or the better approach to mobile ad-hoc networking (B.A.T.M.A.N.), among others. The mesh network could then communicate with devices in the cloud 100 through the IoT gateway 300.

The IoT gateway 300 may be powered by a local power source, such as a battery 306. The local power source may include any number of other units in addition to, or instead of the battery 306, such as line connected power supply or charger 308, solar cells, or wind generators to charge the battery 306, among others.

The mass storage 206 may include a number of modules to implement the data transfer functions described herein. These modules may include a data transfer controller 310 that controls the data transfer to a coordinator or server in the cloud 100. The data transfer controller 310 may store data from the sensors 212 and the IoT devices 200 that cannot be sent due to network congestion. Further, the data transfer controller 310 may instruct the IoT devices 200 to adjust the rate at which they send data to the IoT gateway 300 or the rate at which data is collected from the sensors 212, for example, depending on available storage space in the IoT gateway 300 versus the available storage space in the IoT devices 200.

A backpressure monitor such as a tracer controller 312 may determine backpressure in the cloud, for example, as determined using the tracer techniques described with respect to FIG. 6. The tracer controller 312 may be configured to receive backpressure alerts, e.g., messages, from backpressure monitors in the cloud 100. The tracer controller 312 may instruct the data transfer controller 310 to adjust the rate at which data, e.g., messages with a sensor reading and a timestamp, is sent out to the cloud 100.

A data store 314, or message cache, may be used as a local buffer to hold messages from the IoT devices 200 or sensor readings that cannot be sent immediately due to network congestion in the cloud 100. The data store 314 may be used by the data transfer controller 310. In some embodiments, the data store 314 may be implemented using a lightweight database approach, e.g., SQLite, where each newly cached message is associated with an index and timestamp. The index increments when a message is pushed onto the cache. An example of a timestamp is UNIX epoch time. The timestamp may be a 10-digit UNIX epoch time representation for resolution in seconds or a 13-digit UNIX epoch timestamp for millisecond resolution.

A data backlog transfer controller 316 may transfer messages that have built up in the data store 314 during a network capacity issue. For example, instead of trying to send backlogged messages immediately upon restoration of communications, the data backlog transfer controller 316 may incrementally send the messages using a number of algorithms. These may include a last in-first out (LIFO) algorithm, a first in-first out (FIFO) algorithm, or a random sampling algorithm. Further, the data backlog transfer controller 316 can be augmented to prioritize messages with higher entropy. Entropy may include the most recent observations being deemed more valuable than older ones.

The IoT gateway 300 may have fewer functional units than shown in FIG. 3, for example, if part of the functionality is implemented virtually. In this type of implementation, the IoT gateway 300 may be a general device, for example, that has an amount of memory, such as 200 Mb, set aside for the operation of a virtual machine (VM). The amount of RAM set aside for the virtual machine may be scaled based on the functions given to the VM. This may allow the use of more general computing devices for the IoT gateway 300, and the IoT devices 200, since the design of the virtual machine may not depend on the underlying hardware, and only the hardware interface for the VM may be unique to an IoT gateway 300. Accordingly, the VM may be implemented across a number of platforms without extensive modifications.

The virtual machine may include functional units similar to units 310-316 used to implement the backpressure system. This may include a data store for holding data from other IoT devices 200 and sensor 214, a data transfer controller for interacting with units in the cloud, including protocol conversion and data transfer functions among others. A unit in the VM similar to the tracer controller may be used to determine the back pressure in the cloud. A backlog transfer controller in the VM can implement the functions described herein for sending data that has been backlogged, for example, due to backpressure in the cloud.

The virtual machine may also be used for implementing virtual sensors. These sensors may use data from real sensors to implement sensors that provide calculated values. For example, a virtual dew point sensor may use measurements from a temperature sensor and a pressure sensor to calculate a measurement for the dew point. Other virtual sensors that may be implemented include testing and validation of other sensors, among others.

The backpressure measurement system itself may be implemented as a virtual sensor, for example, in a virtual machine in the IoT gateway 300, an IoT device 200, or in another unit, for example, in the cloud. In these embodiments, the backpressure measurement may be treated as a sensor reading that is read from the virtual backpressure sensor. The backpressure measurement may then be used to control the data transfer, as described herein. Accordingly, the collection and use of the backpressure measurement may be integrated into the system without implementing any messaging system, additional communications system, or protocols.

Figure 4:
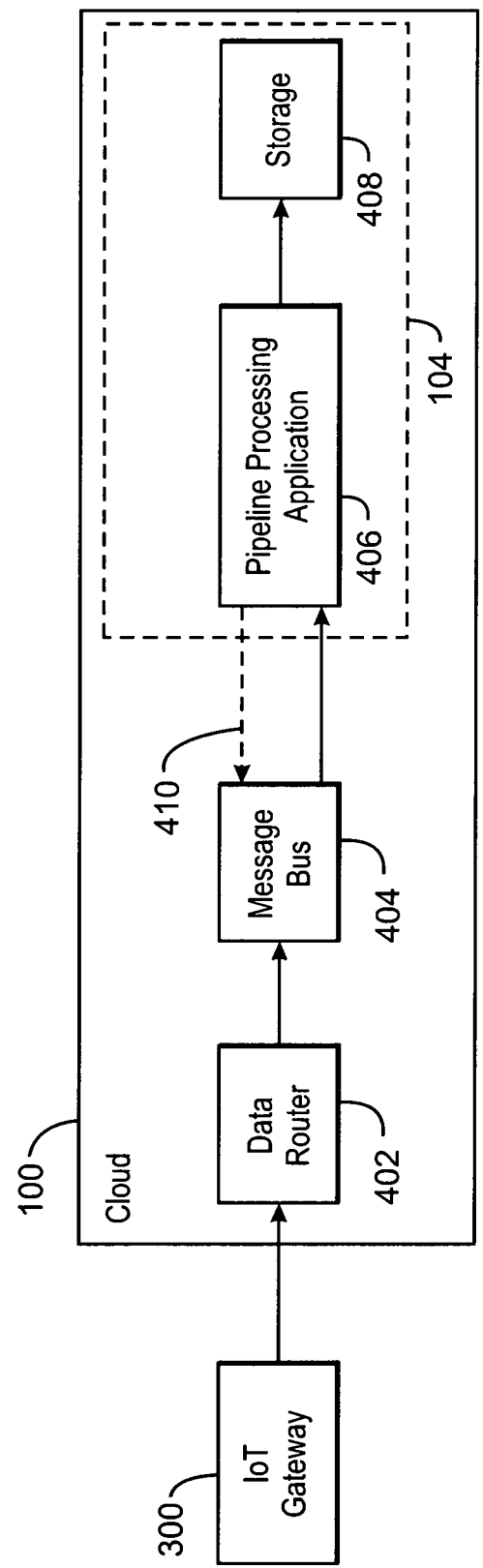
FIG. 4 is a block diagram of an example of an IoT deployment with backpressure control residing completed in the cloud.

FIG. 4 is a block diagram of an example of an IoT deployment with backpressure control residing completed in the cloud 100. Like numbered items are as described with respect to FIGS. 1 and 3. In this example, the cloud 100 includes a router 402, a message bus 404, a pipeline processing application 406, and a storage system 408. The pipeline processing application 406 and the storage system 408 may be part of a server 104.

The numbers below are provided for a specific example to clarify the techniques. However, this is merely one example of many possible configurations. In this example, it may be assumed that there are 20,000 IoT gateways 300 distributed across a city. Each of the IoT gateways 300 has 10 sensors attached, e.g., directly to a sensor interface or as part of other IoT devices. The IoT gateways 300 may send one data observation from each of their 10 sensors on a fixed or event driven time interval. The average message size sent from each IoT gateway 300 in this configuration may be 3.5 Kb. Each IoT gateway 300 has an 8 GB SD card, of which about 6 GB is available once the operating system and applications are installed.

The data router 402 in the cloud 100 has two nodes, each with about 40 GB of local storage which is used as a message buffer. The message bus 404 in the cloud has two nodes, each with about 40 GB of local storage which is used as a message buffer.

The pipeline processing application 406 has two nodes, with no requirement to cache messages. The pipeline application, e.g., data processing application, running on them consumes messages from the message bus 404, processes the messages and stores the data in the storage system 408. If the storage system 408 is down, backpressure messages 410 may be used to stop messages from the message bus 404, wherein the messages may be buffered in the message bus 404. If the message bus 404 is down, the messages queue up in the data router 402.

In this example, the storage system 408 has a distributed database cluster across seven nodes, wherein each instance has about 10 TB of storage making a total of about 70 TB. The entire system has a message buffering capacity of about 120,160 GB (20,000×6 GB+2×40 GB+2×40 GB). However, only about 0.15% of this capacity is in the cloud.

A system without the techniques described herein cannot take advantage of the resources that are not in the cloud 100. Thus, it may only be able to respond to outages and congestion by buffering messages at an appropriate point in the pipeline. Further, it may be limited to enabling auto-scaling on the buffering components and dealing with the complexity of scaling services simply in order to queue up data until normal service resumes.

In contrast, a system using the techniques described herein, may respond to congestion messages which may come from the cloud, from the network itself, or from peers allowing the IoT gateways 300, and IoT devices 102, to use local resources to queue up messages at their source, or poll sensors less frequently to reduce the rate at which new data is being generated, or both.

The techniques described herein binds the two domains, enabling backpressure mechanisms that may exist in the cloud, or elsewhere, such as in the network or on peer devices, to be detected. These can be used to change the operation of edge devices that are closer to the true source of the data arriving to the cloud. Backpressure approaches may be extended to the edge devices using the messages that control the flow of data in the cloud.

Further, the backpressure detector may be implemented in the data router 402, or the message bus 404, for example, as a virtual machine (VM). In this embodiment, the backpressure detection may be implemented as a virtual sensor in the VM that may be read by other units, such as IoT gateways 300 and IoT devices 200 for backpressure control of data transfer.

In some embodiments, the IoT gateway 300 may be implemented in the data router 402 or the message bus 404 as a VM. In these embodiments, the data from the IoT devices 200 flows to the virtual IoT gateway for transfer to other units in the cloud. The virtual IoT gateway may implement other types of virtual sensors, for example, calculated values based on sensor readings from IoT devices 200.

Figure 5:
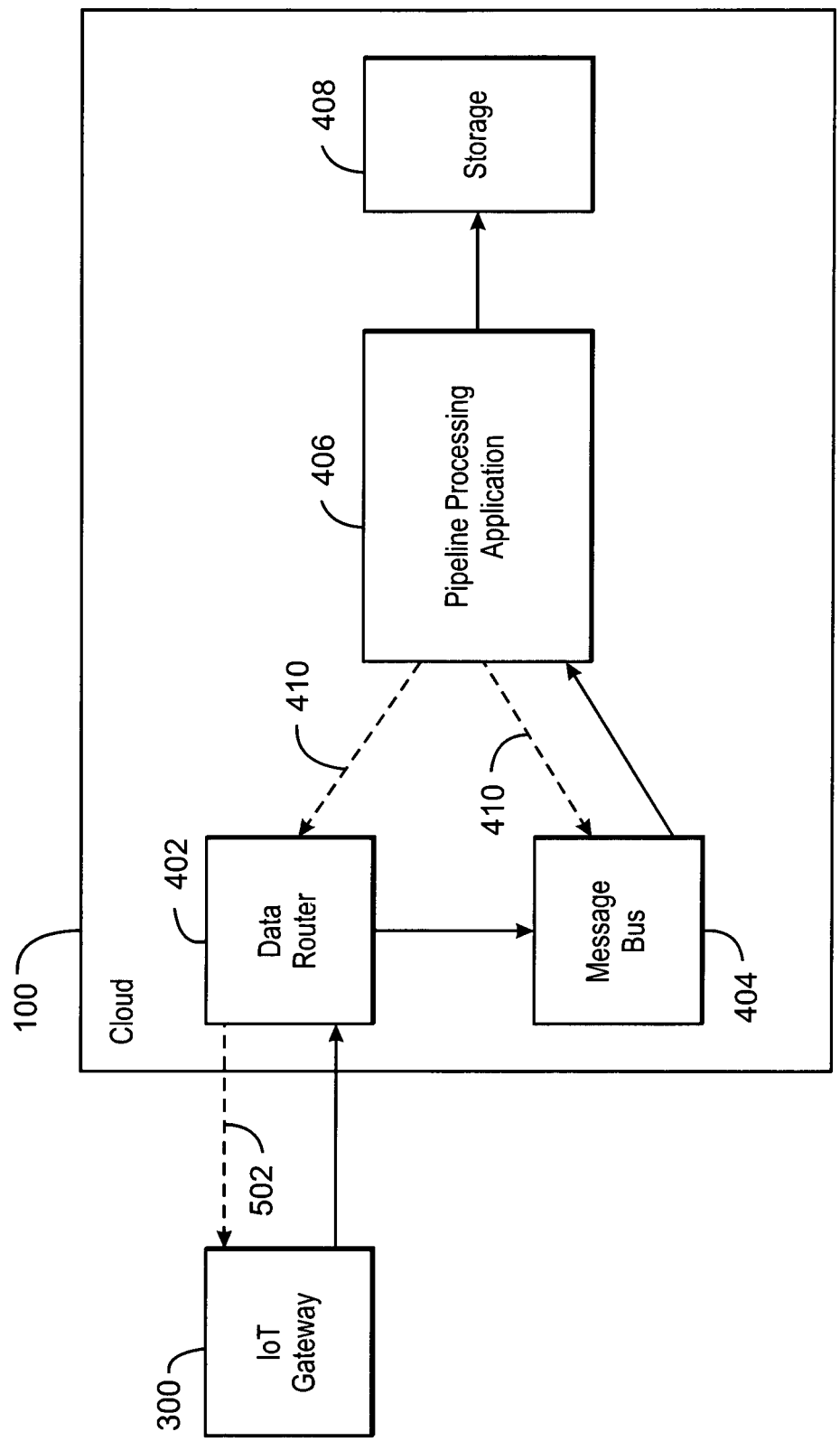
FIG. 5 is a data processing pipeline in the cloud 100 with backpressure detection extended to an IoT gateway.

FIG. 5 is a data processing pipeline in the cloud 100 with backpressure detection extended to an IoT gateway 300. Like numbered items are as described with respect to FIGS. 1, 3, and 4. In this example, backpressure messages 410 may sent from the pipeline processing application 406 to all units along the data pipeline, including the data router 402 coupled to the IoT gateway 300. Further, backpressure messages 502 may be sent from the data router 402 to the IoT gateway 300 outside of the cloud to enable local control of data generation and message transmission rates, allowing local caching of messages.

The IoT gateways 300 may perform a number of functions. They may act as a data source as they directly poll sensors, or act as data aggregation points or entry points for IoT devices sending data through the network. The IoT gateways 300 may host the message dispatch and replay systems, and take actions in response to backpressure messages 502 from the cloud.

The data router 402 enables a bi-directional edge, e.g., from an IoT gateway 300, to cloud communication. In one embodiment, a multi-protocol cloud gateway (MPCG) may act as the data router, enabling a number of protocols, such as message queuing telemetry transport (MQTT) and representational state transfer (REST).

The message bus 404 may be a publish/subscribe broker. In one embodiment, Apache Kafka from the Apache Software Foundation performs this function. Data flows into the message bus 404 and is consumed from it by pipeline applications.

The pipeline processing application 406 stores the data, performs data analysis, and calculates some statistical information such as message throughput rates. It may also generate actuation messages and detect congestion in the pipeline. In one embodiment, Akka from Typesafe Inc. hosts this functionality. The pipeline processing components can detect the presence of two types of conditions, backpressure resulting from one or more pipeline components being unavailable and backpressure resulting from a constraint of one or more pipeline components.

The storage system 408 may be implemented with any number of server or cloud storage systems. In one embodiment, the storage system 408 may be implemented with OpenTSDB API on top of Cloudera. OpenTSDB implements Telnet and REST interfaces.

FIG. 6 is a schematic diagram of a backpressure detection system using tracer messages to measure system congestion. Like numbered items are as described with respect to FIGS. 1 and 4. To begin, the pipeline processing application 406 sends a batch of tracer messages 602-606, one to each of the 1 to n cloud components. A tracer is a special message whose contents and frequency of dispatch are known.

The tracer messages 602-606 make their way through each component of the pipeline. For example, tracer message 602 sent to the data router 402 is forwarded on to the message bus 404 as tracer message 608. From the message bus 404, both tracer messages 608 and 604 are forwarded, e.g., returned, to the pipeline processing application 406 as tracer message 610. A tracer message 606 sent to the storage system 408 is returned as tracer message 602. The pipeline processing application 406 may monitor for returned tracer messages 610 and 612, or responses, may be stored as indicated by line 614 as any other message, e.g., in a store of responses. Thus, the stored messages can be queried. The absence of one or more messages indicates that a pipeline component may be down.

Additionally, the time delay between sent tracer messages and returned tracer messages, or responses, allows a determination of the level of congestion in the pipeline. We calculate the congestion level, c, as being the smaller of either the throughput congestion level, tc, or the buffer congestion level, bc. These values may be determined by sending batches of tracer messages m1 to mn to cloud components 1 to n at fixed time intervals, t0, t1, t2, and so on.

If a component has failed and is unresponsive, sending the tracer message to that component will fail, throwing an exception. It may therefore be assumed that the component is down. Accordingly, c is set to 0 and an alert is sent. Otherwise, all tracer messages get successfully sent.

At a second time t0', t1', t2' (the interval is configurable) a query can be submitted for the tracer messages. Missing tracer messages indicate one or more components are down or are severely constrained. If tracer message m1 and m2 are not received after a configurable period of time, but m3 to mn are, then we know that component 1, 2, or both, has an issue and c is set to 0 as the pipeline has a serious service availability issue. For each tracer message, the time difference between sending it and the time it was stored is calculated. We also calculate the relative time differences between each tracer message.

The results of these calculations provide an independent system which is capable of quantifying the performance of each pipeline component without relying on either component or implementation specifics. Table 1 shows the results that may be obtained from the tracer messages.

TABLE 1

Tracer message measurements of network congestion.

| Batch 1 | t0 (time tracer is sent) | tn (time tracer is stored in db) | tt Time (ms) to process (tn − t0) | tp Time (ms) for component n to process tracer |
|---|---|---|---|---|
| Tracer 1 | 1444981381000 | 1444981381400 | 400 | 250 |
| Tracer 2 | 1444981381000 | 1444981381280 | 280 | 30 |
| . . . | 1444981381000 | 1444981381250 | 250 | 150 |
| . . . | 1444981381000 | 1444981381100 | 100 | 50 |
| Tracer n | 1444981381000 | 1444981381050 | 50 | 50 |

The tracer message process is repeated for batch 2, 3, and so on, maintaining two counts, a sliding time window with averages for tt and tp values, which provide the real-time current performance. A second count is an all-time average for tt and tp values, which provides the baseline performance. The current performance is compared to the baseline performance to calculate the throughput congestion rate, tc, for the overall pipeline and for each pipeline component where:

$tc = \text{current/baseline}$ (if current>baseline, then tc=1; tc cannot be >1 or <0)

Buffer congestion, bc, is then calculated for components of the pipeline capable of buffering messages. In general, the buffer congestion metric can be expressed as follows:

$$bc[n] = \begin{cases} 1, & \text{if no buffer congestion is present} \\ \geq 0, & \text{otherwise} \end{cases}$$

where $0 \leq bc[n] \leq 1$.

Specifically, we determine the buffer congestion metric from the amount of free disk space, message rate, size of messages, and the number of seconds required to fill the buffer. The number of seconds, n, required to fill the buffer is calculated as follows:

$$n_s = \frac{d_f}{m_k} \cdot \frac{m_s}{60},$$

where $d_f$ is the current free disk space total in kB, $m_k$ denotes the average message size in kB, and $m_s$ denotes the current message per second rate as determined from the processing pipeline. We calculate buffer congestion, bc[n], as follows:

$$bc[n] = \begin{cases} 1, & \text{if } dp \geq p_{thresh} \\ bc_n, & \text{if } dp \leq p_{thresh} \end{cases},$$

where dp denotes the free disk space percentage on the cloud components, $p_{thresh}$ is a configurable free disk space threshold, e.g. 50%, and $bc_n$, is calculated as follows:

$$bc_n = \frac{n_s}{n_{max}}, \text{ where } n_{max} = \frac{d_{max}}{m_k} \cdot \frac{m_s}{60},$$

and $d_{max}$ denotes the maximum disk space available to the system.

The lowest value of c in the pipeline indicates which component is most constrained. Such a data processing pipeline performs only as well as its slowest component. If the value of c has changed significantly, then it may be sent to the IoT gateways as an alert, for example, in a message. In the sample JavaScript Object Notation (JSON) message below, the congestion value is 0.6112:

```
{
    "msg_type": "congest_alert ",
    "account_id": "alldevices",
    "sender_id": " 001320FDFFED ",
    "timestamp": "1434054270",
    "data_source": [
        {
            "name": "eventalert",
            "metrics": [
                {
                    "name": "congestion-alert",
                    "sample": [
                        {
                            "timestamp": "1434054270",
                            "value": "0.6112"
                        }
                    ]
                }
            ]
        }
    ]
}
```

Once the congestion alert is received by the IoT gateways, they can adjust the rates at which they are polling sensors, e.g., generating new data, and the rates at which they are sending data to the cloud. Similarly, an IoT gateway can send a message to any IoT devices using the IoT gateway as a connection to the cloud instructing the IoT devices to adjust sending rates or data collection rates. In the example above, the IoT gateways may slow the rate at which they are sending data to the cloud until the congestion rate recovers closer to one. The back pressure alerts may also be used in the cloud to allow messages to queue up in appropriate components, such as in the message bus if a later component has failed or is congested.

Figure 7:
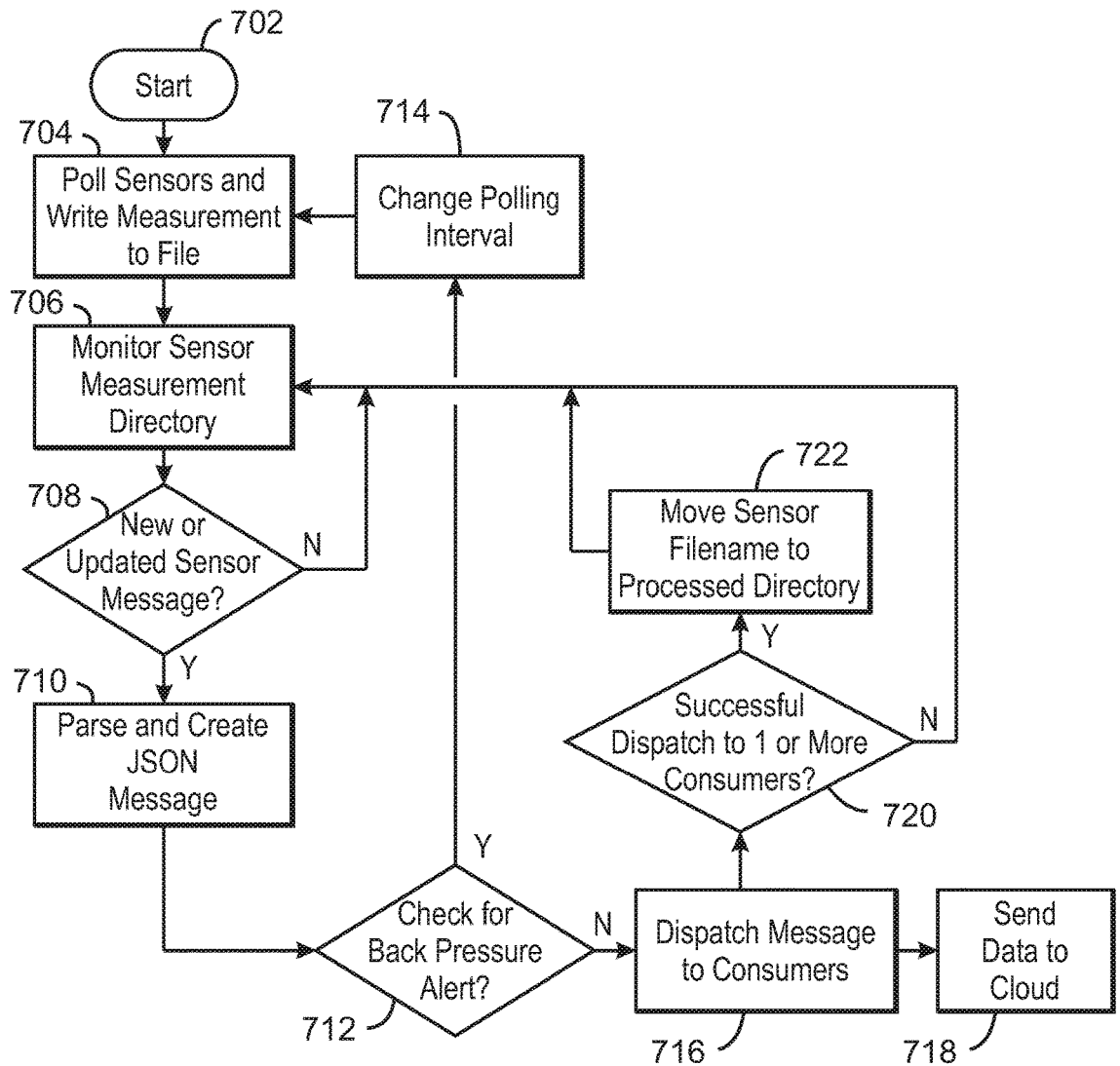
FIG. 7 is a process flow diagram of method for an enhanced message dispatch from an edge device.

FIG. 7 is a process flow diagram of method 700 for an enhanced message dispatch from an edge device. The method 700 begins at block 702 when the system is started and placed in communications with a cloud.

At block 704, sensors and/or sensing nodes are polled on a schedule. The data gathered from the sensing nodes results in name-value observations being written to files in a specified directory by the sensor application.

At block 706, the specified directory is monitored. This is performed to check if a sensor data file has been created or updated within the monitored directory. At block 708, a determination is made as to whether new sensor data is present.

If so, at block 710, the sensor data file is opened and the name-value pair string information is parsed. Following parsing, a JSON payload is created in preparation for dispatch to the destination. Details of the filename and timestamp are inserted as metadata into the processing queue. The message is pushed onto a queue buffer in readiness for dispatch to the destination. The publisher pops a message from the queue.

At block 712, a determination is made as to whether a backpressure alert has been received. If so, and a backpressure condition exists, the message will not be sent. It remains in the queue, and process flow proceeds to block 714.

At block 714, the polling interval is adjusted. The polling interval is initialized as follows:

$$p_i = \max(r, b),$$

where r denotes the current rate and b denotes the backpressure rate. The backpressure rate is the rate adjusted for the current congestion, c, which may be calculated as c×r. The polling interval, $p_i$, may then be optimized as follows:

$$p_i = \begin{cases} 1, & \text{if } p_i \geq 1 \\ \frac{m_k}{d} \cdot r \cdot b, & \text{otherwise} \end{cases},$$

where $m_k$ denotes the message size expressed in kB, d denotes the amount of free disk space on the edge device expressed in kB, r denotes the current messaging rate, and b denotes the backpressure rate.

If at block 712, no backpressure conditions are detected, then process flow proceeds to block 716. At block 716, the message 718 is dispatched to the destination.

At block 720, a determination is made as to whether the message was successfully dispatched. Is so, process flow proceeds to block 722. At block 722, the message metadata, e.g., the filename and timestamp, is extracted. Using the metadata information, the original sensor message file is moved from the monitored directory to a directory for processed information.

If at block 720, it is determined that the message was not successfully dispatched, it remains in the monitored directory, e.g., on the backlog, for replay at a later stage, for example, using the method 800 of FIG. 8. Process flow then returns to block 706.

Figure 8:
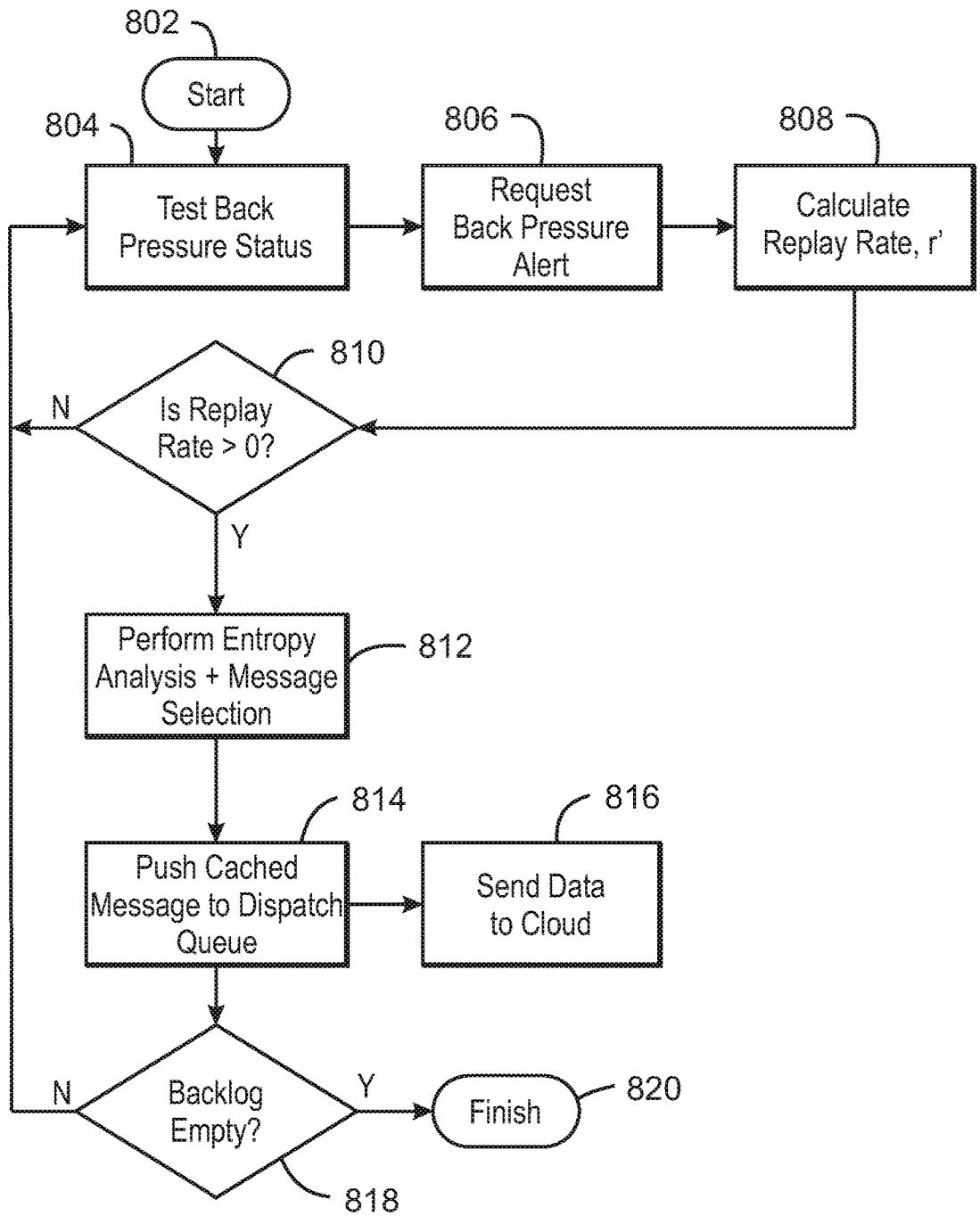
FIG. 8 is a process flow diagram of a method for replaying messages that have not been successfully sent to a destination.

FIG. 8 is a process flow diagram of a method 800 for replaying messages that have not been successfully sent to a destination. In the method 800, the backlog is analyzed and a dispatch or replay rate, r, is calculated such that the overall flow of messages to the cloud system is reduced if the cloud is in a backpressure state or is increased if the cloud is not constrained. The method 800 begins at block 802 when it is detected that a message has not been successfully dispatched.

At block 804, a backpressure status is checked by checking if a backpressure alert is present. At block 806, the IoT gateway or device requests the backpressure alert if not present. If a backpressure alert message has been recently received, then there may be no need to contact the cloud. The period can be configured. The communication to obtain the alert may be an MQTT subscription, a REST, or web socket call, among others.

If there is an updated backpressure alert, at block 808 the updated replay rate, r', may be calculated. The mode of operation may be determined from the replay rate value. During normal operation, r=1, if r<1, then a congestion scenario has occurred, and when r>1, the system is in replay mode. The general message dispatch frequency, f, is a configurable constant, for example it may be once per minute. The replay rate may be calculated as follows:

$$r' = r \cdot f$$

where r' denotes the new replay rate and f denotes the message dispatch frequency.

At block 810, a determination is made as to whether the replay rate >0. If so, then messages will be attempted to be sent and process flow proceeds to block 812. At block 812 an entropy analysis may be performed on the cached messages to determine which ones should be replayed. For example, the messages may be sorted in a LIFO queue (last in, first out) so that the newest observations are sent first. This may be important as recent observations may have higher entropy than older messages, e.g., having more importance to the current state. Optionally, the LIFO queue may then be further sorted based on an entropy analysis. This may be performed on the cached messages to determine which ones should be replayed. An example of an analysis process is to calculate observations which are outside the normal ranges either in terms of the value seen, or the metric, or the frequency that those value ranges or metrics names are seen. Less frequently occurring ranges or metric names have potentially higher entropy, e.g., information value.

At block 814, messages are pushed onto the message dispatch system processing queue. At block 816 the messages are sent to the cloud, for example, using the message dispatch method of FIG. 7.

At block 818, a determination is made as to whether the backlog is empty, e.g., all remaining cached messages have been successfully dispatched. If so, process flow ends at block 820. If not, process flow returns to block 804 to continue the method 800. If further network connectivity outages occur during the replay process, the replay mechanism will also end and return to the network connectivity monitoring state.

An example congestion message is shown below for illustrative purposes, the congestion value is 0.6112. This message could be in any format from any source as long as it contains a numerical value for the congestion level. In a basic implementation, the value could simply be 0 to indicate there is congestion present or 1 to indicate that there is no congestion. In a more sophisticated system the congestion level may be calculated in a specific way and may be representative of a level of congestion which would enable more fine grained decisions to be taken on the IoT gateway:

```
{
    "msg_type": "congest_alert ", "account_id": "alldevices", "sender_id": " 001320FDFFED ", "timestamp": "1434054270", "data_source": [
        {
            "name": "eventalert", "metrics": [
                {
                    "name": "congestion-alert", "sample": [
                        {
                            "timestamp": "1434054270", "value": "0.6112"
                        }
                    ]
                }
            ]
        }
    ]
}
```

This provides a technical solution for orchestrating how IoT gateways dispatch data to a backend data pipeline system. It provides fine-grain support for backoff delays and messaging strategies, e.g., latest message first, oldest message first, or sampled messages. IoT gateway messaging orchestration is driven by the backend pipeline system and can operate on a per-gateway in addition to all-gateway basis.

Figure 9:
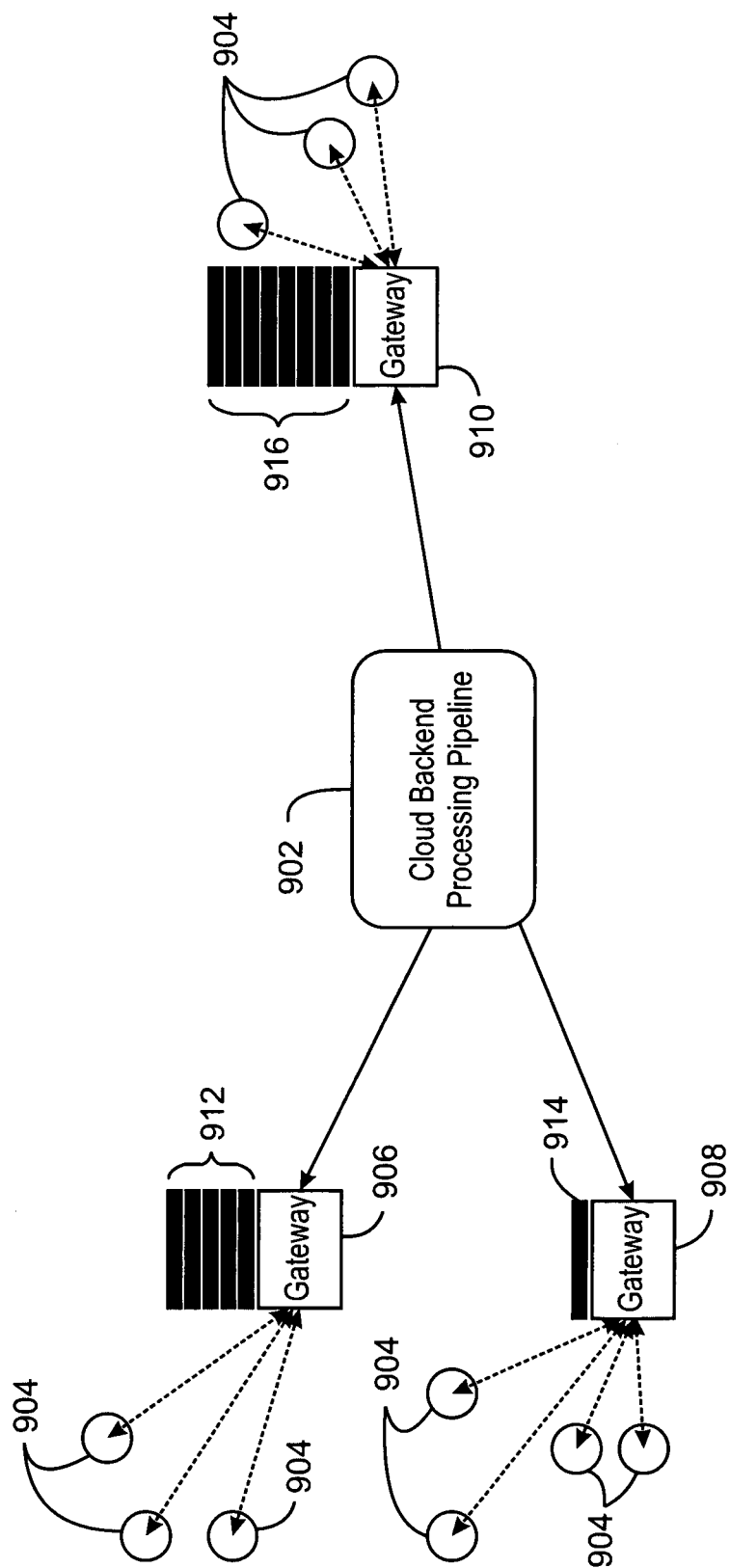
FIG. 9 is a schematic diagram of an IoT system in which the cloud-based data processing pipeline is able to orchestrate how the cached messages are replayed.

FIG. 9 is a schematic diagram of an IoT system 900 in which the cloud-based data processing pipeline 902 is able to orchestrate how the cached messages are replayed. Three examples are depicted, first in-first out (FIFO), last in-first out (LIFO), and random message selection. In FIG. 9, multiple IoT endpoints, e.g., sensors 904 in this example, are connected to IoT gateways 906-910. The IoT gateways 906-910 in turn are connected to the cloud-based data processing pipeline 902.

Each of the IoT gateways 906-910 has a message cache 912-916 of varying sizes. These cached messages may be due to temporary network outages which prevented the normal dispatch of sensor messages and had to be stored on the IoT gateway 906, 908, or 910 until network connectivity was restored.

Normally, upon the restoration of network connectivity, the IoT gateways 906-910 would commence replaying the cached messages beginning with the oldest message in the cache and progressing to the latest cached message until the cache was exhausted. In addition, a normal objective may be to replay these cached messages as quickly as possible. However, this can present problems for the cloud-based data processing pipeline 902, e.g., a data deluge resulting in large processing load spikes, congestion, and high network traffic loads.

In the techniques described herein, the cloud-based data processing pipeline 902 may orchestrate how the cached gateway messages are replayed. Three systems may be used, with different IoT gateways 906, 908 or 910 instructed to send messages by different methods. For example, a first IoT gateway 906 may be instructed to replay messages from the message cache 912 as first in-first out (FIFO). This is the default behavior, as the endpoint messages are replayed in the same time-order that they were cached.

A second IoT gateway 908 may be instructed to replay messages from the message cache 914 as last in-first out (LIFO). This may be used for time-sensitive cached messages, such as control systems used for pipelines, traffic, and the like. Upon network connectivity restoration, the latest messages are replayed first in order to minimize the impact on time-sensitive IoT applications.

A third IoT gateway 910 may be instructed to replay messages from the message cache 916 by a random message selection and dispatch (sampled). As the number of cached messages can extend to several thousand, this technique may provide a more accurate picture of the period during which data was lost. This strategy enables time-sampled messages to be replayed in order to provide backend applications with sufficient data points to develop a summarized analysis over the period affected by the network outage. As the replay strategy progresses, the intermediate messages are then replayed to eventually backfill the entire time period.

In all replay strategies, the intervals between message replay events can be configured by the cloud-based data processing pipeline 902. This is especially useful for minimizing the potential for large processing workload spikes due to data deluges. The replay rate can be finely-tuned on a per IoT gateway if necessary.

Additional modes and variations of these three example modes may be supported by this system. The cloud-based data processing pipeline 902 can configure the IoT gateway messaging strategy using two methods, by broadcasting a global control message to every connected gateway for a blanket messaging strategy change, or by sending a targeted dispatch of a control message to an IoT gateway 906, 908, or 910. The control messages may not be protocol-specific. In examples the message may include a JavaScript Object Notation (JSON) message, an MQTT topic or payload, or a REST message, such as an HTTP POST, among others.

This may be further explained through an example describing the data storage and flows. As for the previous example, it may be understood that the numbers used are merely representative of a single case. In this example, 10,000 IoT gateways may be distributed across a large urban and suburban area. Each gateway may responsible for ten IoT endpoints, such as sensors or IoT devices. The IoT gateways dispatch one observation message from each of the ten endpoints per minute resulting in 600 messages per hour. In this example, the average message size sent from each gateway may be about 3 kB. The total number of messages per hour for the entire deployment is about 6 million, and the total size of the entire messaging workload is about 17.16 GB/hour.

If a network connectivity outage affects 10% of the gateways for a 2 hour period, the 1000 gateways involved must each cache their 600 messages/hour for this 2 hour period until connectivity is restored. In total, 12 million messages have been cached on gateways representing about 3.43 GB.

Following restoration of network connectivity, the total size of the messaging payload may temporarily increase to about 20.59 GB if the cached messages are all replayed within an hour period following the restoration of network connectivity. This represents a 20% increase in backend data pipeline processing workload.

However, if the data processing pipeline orchestrates the replay procedure using a combination of sampled data, e.g., instructing the IoT gateways involved to take every $10_{th}$ measurement, back-off sending replayed messages by a factor of ten, and using LIFO for time-critical applications, the increase in backend data pipeline processing workload will be about 2%. Thus, the extra workload is reduced by a factor of ten.

Figure 10:
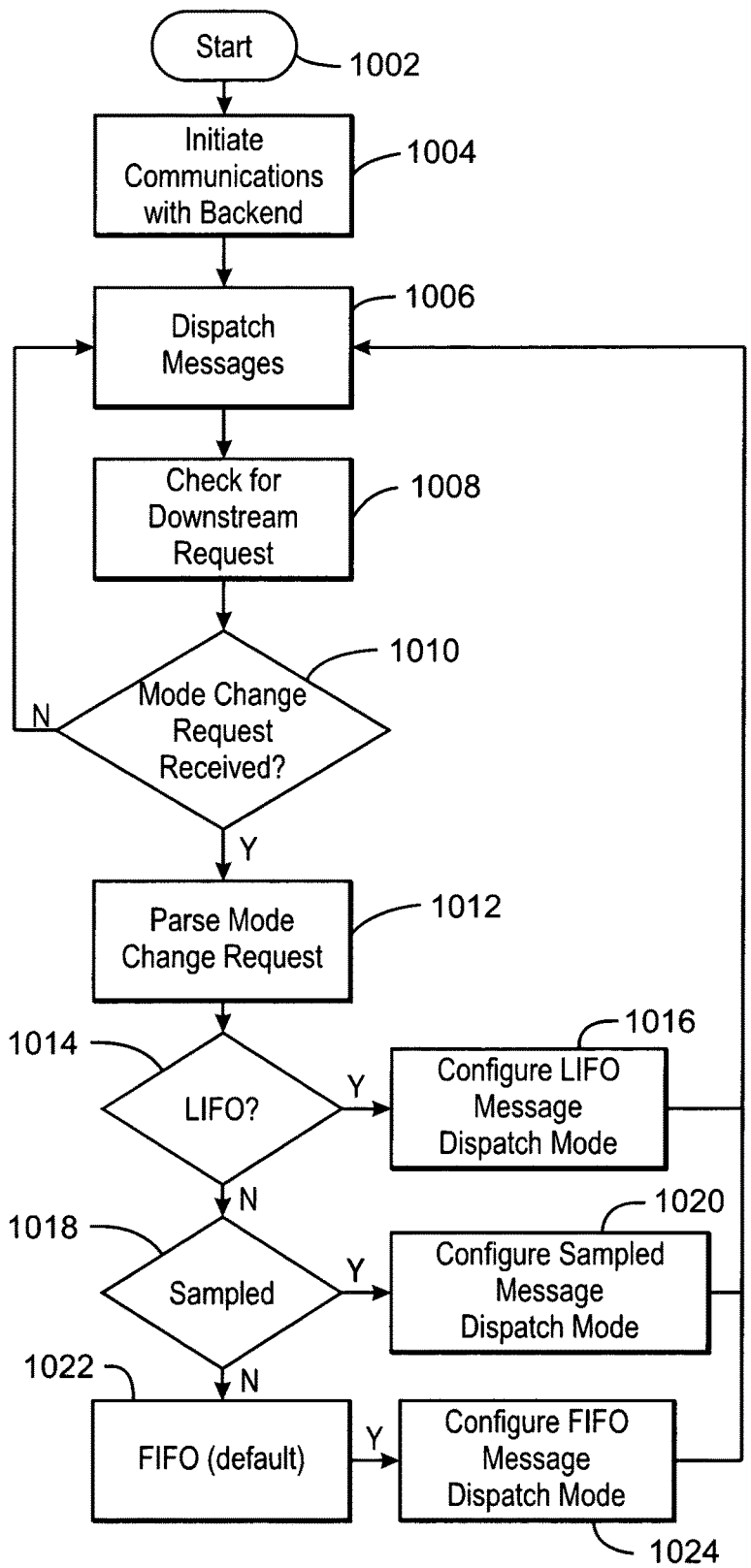
FIG. 10 is a process flow diagram of a method for orchestrating messages.

FIG. 10 is a process flow diagram of a method for orchestrating messages. The method starts at block 1002, for example, when an IoT gateway is powered. At block 1004, communications between the IoT gateway and backend data processing pipeline is established. At block 1006, the gateway commences the dispatch of messages, if endpoint messages are pending.

At block 1008, the IoT gateway checks for downstream configuration messages from the backend. At block 1010, a determination is made as to whether a mode change requested has been received. If not, process flow returns to block 1006 to continue with message dispatching.

If a backend request has been received, process flow proceeds to block 1012, where the message is parsed. At block 1014, a determination is made as to whether the LIFO mode is selected. If so, the LIFO mode is configured at block 1016. Process flow then returns to block 1006.

At block 1014, a determination is made as to whether the LIFO mode is selected. If so, the LIFO mode is configured at block 1016. Process flow then returns to block 1006.

At block 1018, a determination is made as to whether the sampled mode is selected. If so, the sampled mode is configured at block 1020. Process flow then returns to block 1006.

If no other mode is selected, the FIFO mode is selected at block 1022. The FIFO mode is then configured at block 1024. Process flow is then returned to block 1006.

Examples of each of these three modes are provided in the following figures. The examples include a backend to gateway control message in JSON format containing replay strategy instructions. In each example, the salient information in contained in the value field of the message where both the desired mode of operation and interval expressed in seconds between replay events is stated. In these example cases, the modes are FIFO, LIFO, and SAMPLED with replay intervals of 12 seconds.

Figure 11:
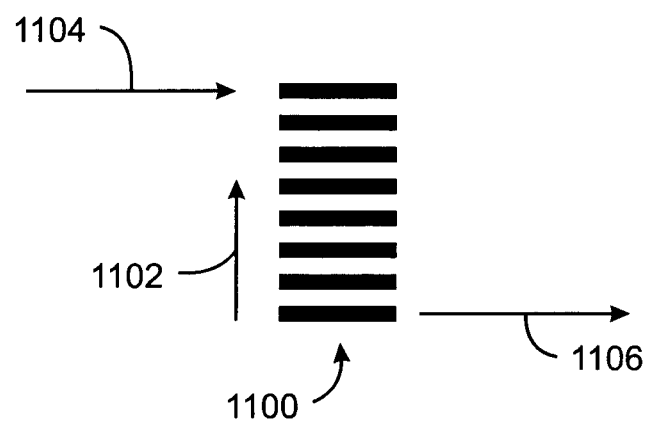
FIG. 11 is a schematic drawing of a FIFO buffer, showing the addition of messages to the queue and the removal of messages from the queue.

FIG. 11 is a schematic drawing of a FIFO buffer, showing the addition of messages to the queue 1100 and the removal of messages from the queue 1100. In this schematic, time 1102 is progressing upwards. Thus, newly created messages 1104 are added to the top of the queue 1100, while older messages 1106 are dispatched from the bottom of the queue 1100.

A JSON message that may be used to activate this behavior is shown below:

```
{
    "msg_type":"replay_config ",
    "account_id":"allgateways",
    "sender_id":"DEADBEEFCAFE",
    "timestamp":"1435034142",
    "data_source":[
        {
            "name":"replay-modification",
            "metrics":[
                {
                    "name":"mode",
                    "value":[
                        {
                            "mode":"FIFO",
                            "interval":"12"
                        }
                    ]
                }
            ]
        }
    ]
}.
```

Figure 12:
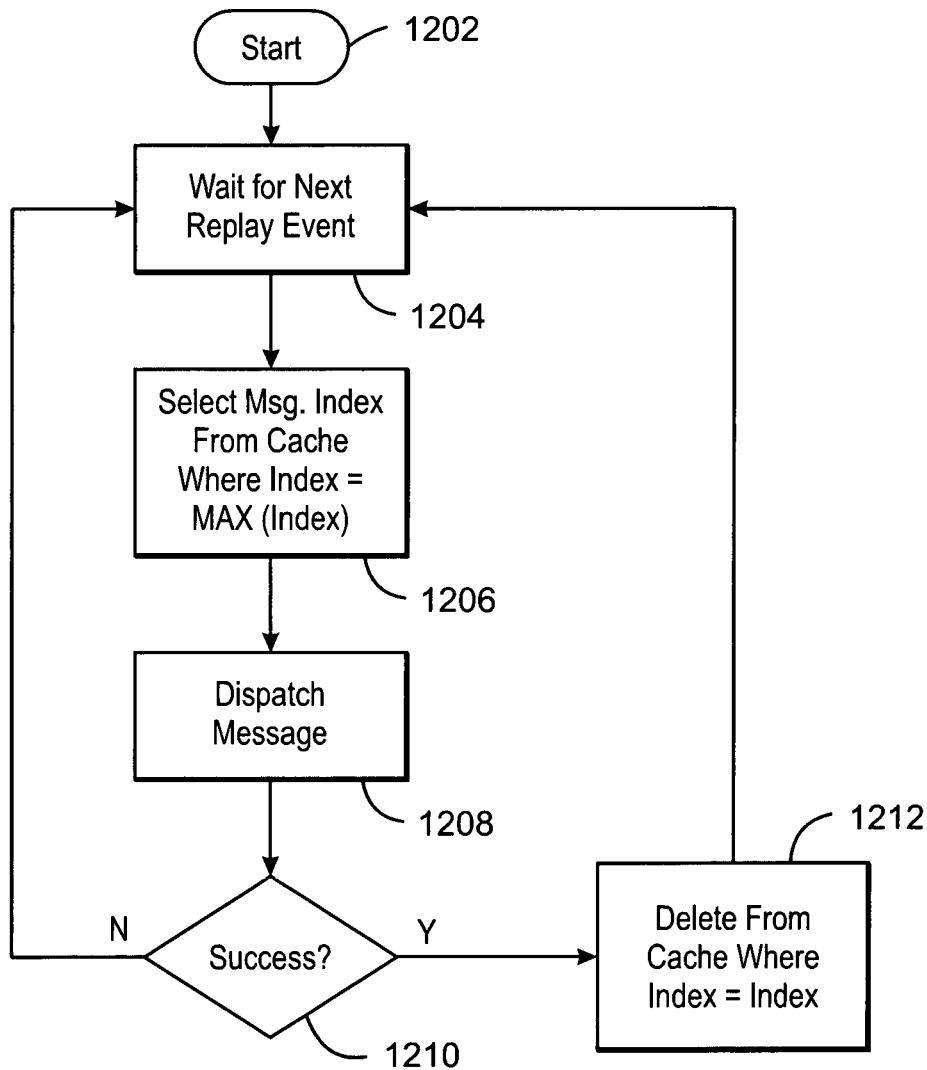
FIG. 12 is a process flow of a method for sending data from an IoT gateway using a FIFO buffer.

FIG. 12 is a process flow of a method 1200 for sending data from an IoT gateway using a FIFO buffer. The method 1200 starts at block 1202, when a FIFO mode has been selected, and the buffer includes messages that have not been successfully dispatched. At block 1204, the method 1200 pauses to wait for the next replay event, e.g., when congestion has dropped indicating that stored messages may be sent. In this example, the SQLite database is used, although any small footprint databases may be used.

When a replay event is triggered, at block 1206, the index of the selected message is obtained using a SELECT statement. For a FIFO operation, the message replay operation selects the oldest message on the queue, e.g., having MAX (index) or message associated with the maximum index of the rows. At block 1208, the message is dispatched. At block 1210, a determination is made as to whether the send was successful. If not, process flow returns to block 1204 to wait for the next replay event.

If the dispatch was determined to be successful at block 1210, process flow proceeds to block 1212. At block 1212, the successfully dispatched message is removed from the cache, and process flow returns to block 1204 to wait for the next replay event.

In the next replay event, the next oldest message may then be selected, dispatched, and upon successful dispatch, removed from the database. The process continues until the cache has been exhausted or until another network connectivity outage occurs.

Figure 13:
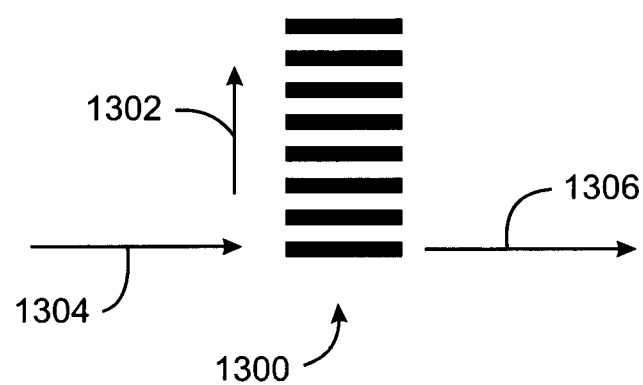
FIG. 13 is a schematic drawing of a LIFO buffer, showing the addition of messages to the queue and the removal of messages from the queue.

FIG. 13 is a schematic drawing of a LIFO buffer, showing the addition of messages to the queue 1300 and the removal of messages from the queue 1300. In this schematic, time 1302 is progressing upwards. Thus, newly created messages 1304 are added to the bottom of the queue 1300, shifting older messages up. The younger messages 1306 are also dispatched from bottom of the queue 1300 in preference to older messages. In this way, time critical messages may be sent and received in preference to older, possibly less relevant, messages.

A JSON message that may be used to activate this behavior is shown below:

```
{
    "msg_type":"replay_config ",
    "account_id":"allgateways",
    "sender_id":"DEADBEEFCAFE",
    "timestamp":"1435034142",
    "data_source":[
        {
            "name":"replay-modification",
            "metrics":[
                {
                    "name":"mode",
                    "value":[
                        {
                            "mode":"LIFO",
                            "interval":"12"
                        }
                    ]
                }
            ]
        }
    ]
}
```

Figure 14:
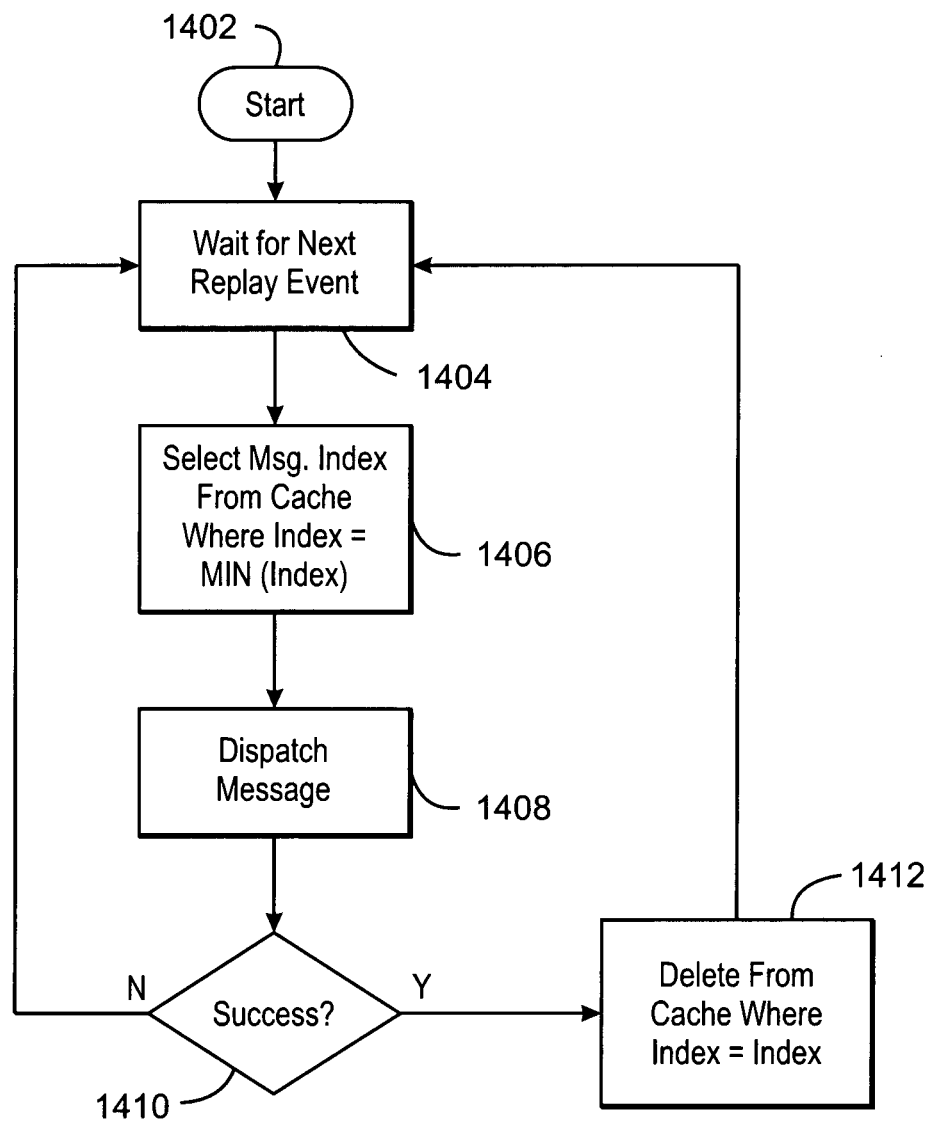
FIG. 14 is a process flow of a method for sending data from an IoT gateway using a LIFO buffer.

FIG. 14 is a process flow of a method 1400 for sending data from an IoT gateway using a LIFO buffer. The method 1400 starts at block 1402, when a LIFO mode has been selected, and the buffer includes messages that have not been successfully dispatched. At block 1404, the method 1400 pauses to wait for the next replay event, e.g., when congestion has dropped indicating that stored messages may be sent. As for the FIFO method, the SQLite database is used, although any small footprint databases may be used.

When a replay event is triggered, at block 1406, the index of the selected message is obtained using a SELECT statement. For a LIFO operation, the message replay operation selects the oldest message on the queue, e.g., having MIN (index), or the message associated with the minimum index of the rows. At block 1408, the message is dispatched. At block 1410, a determination is made as to whether the send was successful. If not, process flow returns to block 1404 to wait for the next replay event.

If the dispatch was determined to be successful at block 1410, process flow proceeds to block 1412. At block 1412, the successfully dispatched message is removed from the cache, and process flow returns to block 1404 to wait for the next replay event.

In the next replay event, the next youngest message may then be selected, dispatched, and upon successful dispatch, removed from the database. The process continues until the cache has been exhausted or until another network connectivity outage occurs.

Figure 15:
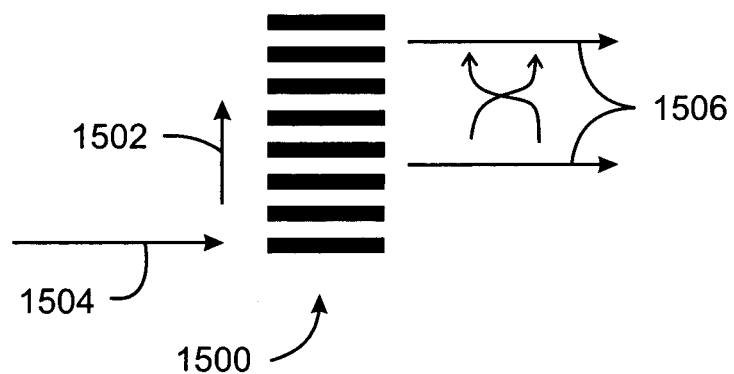
FIG. 15 is a schematic drawing of a sampled buffer, showing the addition of messages to the queue and the removal of messages from the queue.

FIG. 15 is a schematic drawing of a sampled buffer, showing the addition of messages to the queue 1500 and the removal of messages from the queue 1500. In this schematic, time 1502 is progressing upwards. Newly created messages 1504 are added to the bottom of the queue 1500, shifting older messages up, but the newly created messages may be added to either end of the queue 1500. A random sampling technique is used to select messages 1506 from the queue 1500 for dispatch. In this way, the back end processing application may interpolate, or otherwise predict values, between readings. As more readings arrive, the predictions become more accurate, until they have caught up to the current values.

A JSON message that may be used to activate this behavior is shown below:

```
{
    "msg_type":"replay_config ",
    "account_id":"allgateways",
    "sender_id":"DEADBEEFCAFE",
    "timestamp":"1435034142",
    "data_source":[
        {
            "name":"replay-modification",
            "metrics":[
                {
                    "name":"mode",
                    "value":[
                        {
                            "mode":"SAMPLED",
                            "interval":"12"
                        }
                    ]
                }
            ]
        }
    ]
}.
```

Figure 16:
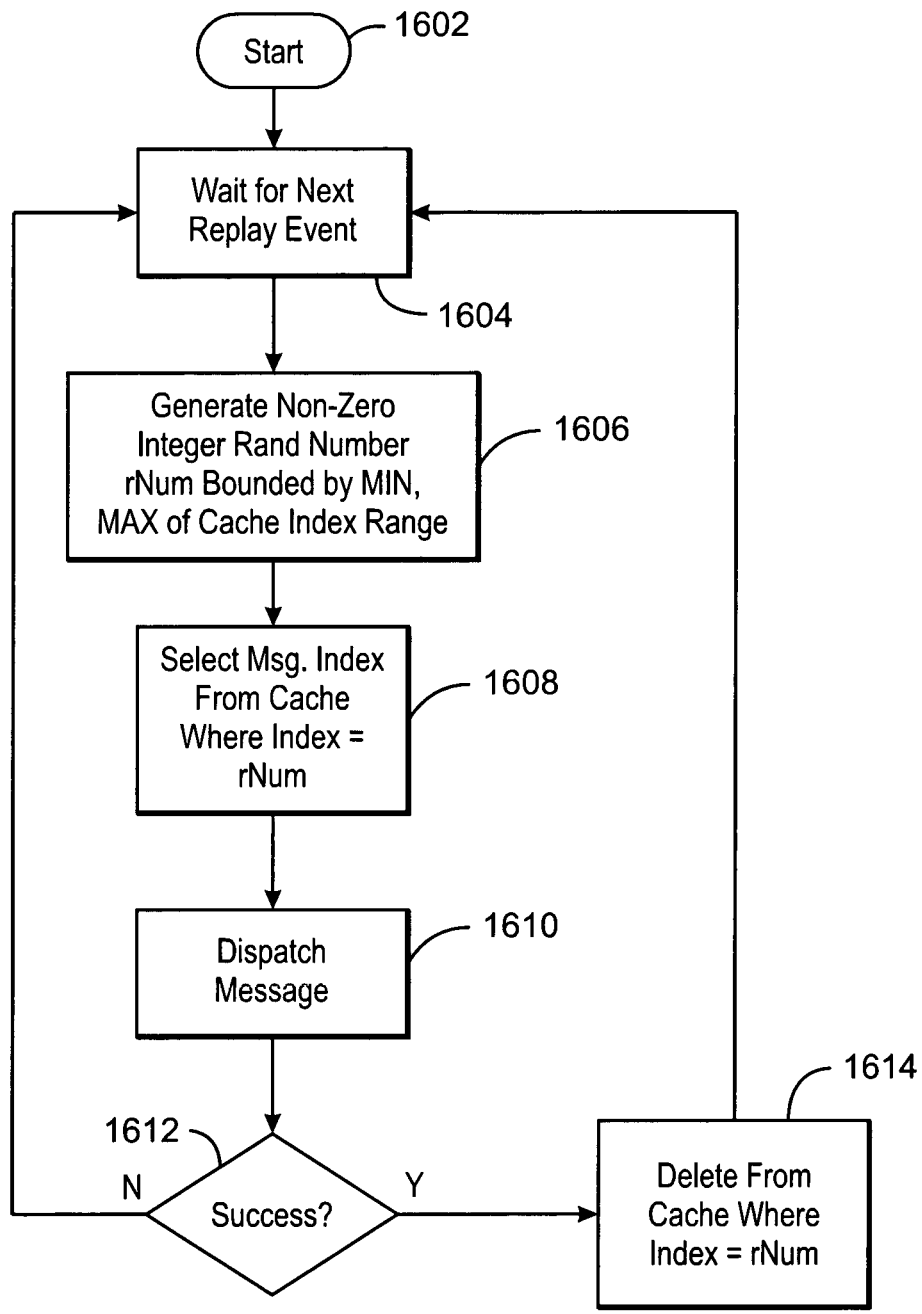
FIG. 16 is a process flow of a method for sending data from an IoT gateway using a sampled buffer.

FIG. 16 is a process flow of a method 1600 for sending data from an IoT gateway using a sampled buffer. The method 1600 starts at block 1602, when a sampling mode has been selected, and the buffer includes messages that have not been successfully dispatched. At block 1604, the method 1600 pauses to wait for the next replay event, e.g., when congestion has dropped indicating that stored messages may be sent. As for the methods above, the SQLite database may be used, although any small footprint databases may be used.

When a replay event is triggered, at block 1606, the youngest and oldest messages may first be dispatched to bracket the measurement set. A random number is generated, wherein the random number is bounded by the MIN and MAX values of the cache range. At block 1608, the index of the selected message is obtained using a SELECT statement. For a sampling operation, the message replay operation selects the message on the queue having the index of the random. At block 1610, the message is dispatched. At block 1612, a determination is made as to whether the send was successful. If not, process flow returns to block 1604 to wait for the next replay event.

If the dispatch was determined to be successful at block 1612, process flow proceeds to block 1614. At block 1614, the successfully dispatched message is removed from the cache, and process flow returns to block 1404 to wait for the next replay event.

In the next replay event, the next youngest message may then be selected, dispatched, and upon successful dispatch, removed from the database. The process continues until the cache has been exhausted or until another network connectivity outage occurs.

Figure 17:
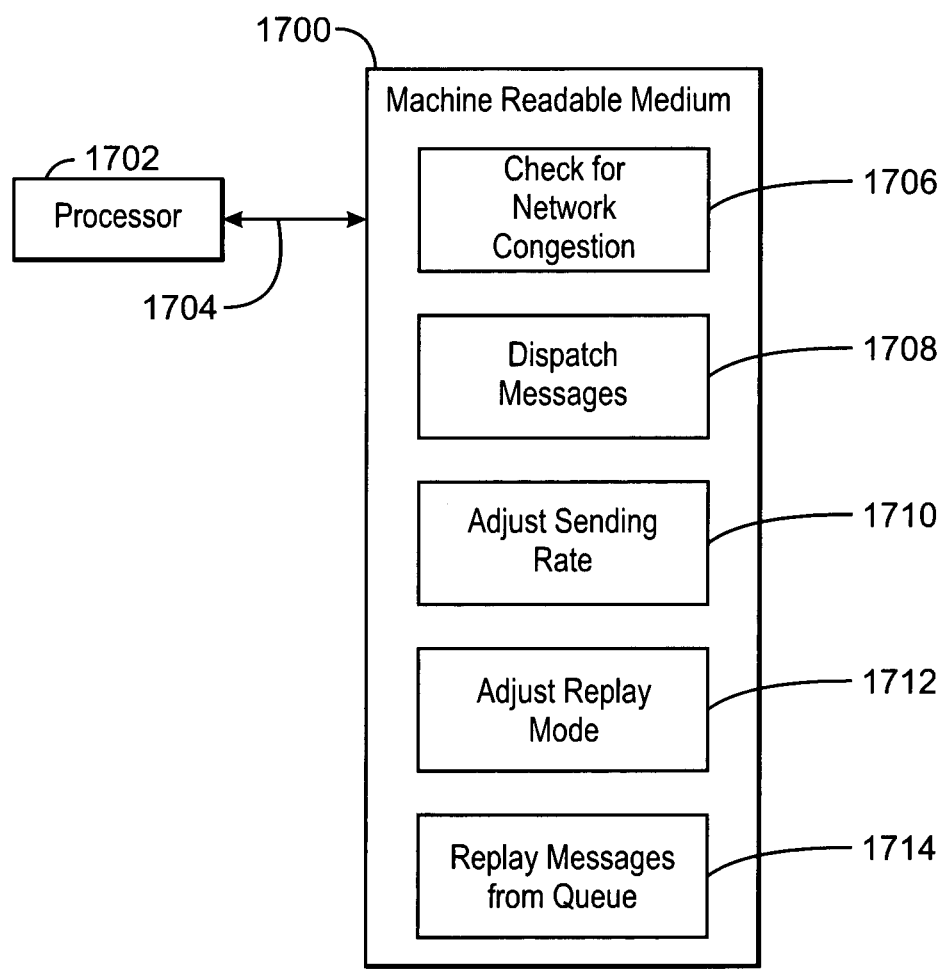
FIG. 17 is a block diagram of a non-transitory, computer readable medium 1700 that includes instructions to direct a processor to manage communications between IoT gateways and devices and systems in the cloud.

FIG. 17 is a block diagram of a non-transitory, computer readable medium 1700 that includes instructions to direct a processor 1702 to manage communications between IoT gateways and devices and systems in the cloud. The processor 1702 can access the computer readable medium over a bus 1704, for example, as described with respect to FIGS. 2 and 3. The instructions may include a code block 1706 to direct the processor 1702 to check for network congestion in the cloud. This may include code that instructs the processor to check for congestion alerts from a system in the cloud. In some embodiments, it may include code that directs the processor 1702 to sends tracer messages to discover and measure network congestion. A code block 1708 may direct the processor 1702 to dispatch messages to the cloud. This may include code to direct the processor 1702 to adjust the rates at which the messages are sent, the rates that data is collected, or both, depending on the amount of congestion in the cloud. Further, code may direct the processor 1702 to determine if the message was successfully dispatched, and remove the message from a cache. A code block 1710 may direct the processor 1702 to calculate the rate at which to send the messages, based on the congestion measured in the cloud and sent by an alert. A code block 1712 may direct the processor 1702 to change the method that replayed messages are sent, e.g., FIFO, LIFO, or sampled. A code block 1714 may direct the processor 1702 to replay messages based on the network congestion, and the method selected.

EXAMPLES

Example 1 provides an apparatus for managing communication congestion for internet of things (IoT) devices, including a pipeline processing application. The pipeline processing application is configured to send tracer messages to each of a plurality of components in a cloud, determine a congestion level, c, by time differences between responses and the tracer messages, and generate backpressure alert messages. The apparatus includes an IoT device that includes a data transfer controller configured to dispatch messages to the pipeline processing application in the cloud; and a backpressure monitor configured to accept the backpressure alert messages and adjust a dispatch of messages from the data transfer controller.

Example 2 includes the subject matter of Example 1, wherein the responses include forwarded tracer messages.

Example 3 includes the subject matter of either of Examples 1 or 2, wherein the IoT device includes an IoT gateway coupled to a plurality of IoT devices and wherein the IoT gateway is configured to pass messages from the plurality of IoT devices to the pipeline processing application.

Example 4 includes the subject matter of any of Examples 1 to 3, wherein the IoT device includes an IoT gateway coupled to a plurality of sensors.

Example 5 includes the subject matter of any of Examples 1 to 4, including a data router in the cloud interfaced to the IoT device, wherein the data router is configured to send backpressure alert messages to the IoT device.

Example 6 includes the subject matter of any of Examples 1 to 5, including a storage device, wherein the storage device includes a store of responses to the tracer messages, and wherein the store of responses is queried to determine time differences between messages.

Example 7 includes the subject matter of any of Examples 1 to 6, wherein the IoT device includes a sensor configured to measure a parameter, and a network interface to dispatch a message including the parameter.

Example 8 provides a method for measuring backpressure in a computing cloud. The method includes sending out tracer messages to a plurality of components in a cloud, monitoring for response messages from the plurality of components, storing received response messages in a storage system, and querying the response messages to determine network conditions in the cloud. An alert message is created to report network conditions to an internet of things (IoT) device.

Example 9 includes the subject matter of Example 8, including identifying that a component has failed by a missing response message.

Example 10 includes the subject matter of either of Examples 8 or 9, including determining a time difference between sending a tracer message and storing a corresponding response message.

Example 11 includes the subject matter of any of Examples 8 to 10, including calculating a congestion level, c, as a number between 0 and 1, wherein a lower value for c represents a slower transfer of data in the cloud.

Example 12 includes the subject matter of any of Examples 8 to 11, including setting c as a lower value of a throughput congestion level, tc, or a buffer congestion level, bc.

Example 13 includes the subject matter of any of Examples 8 to 12, including calculating tc for a component as a ratio of a current time for a response divided by a baseline time for the response from the component.

Example 14 includes the subject matter of any of Examples 8 to 13, including calculating bc from an amount of free disk space, a message rate, a size of messages, or a number of seconds required to fill a buffer, or any combinations thereof.

Example 15 includes the subject matter of any of Examples 8 to 14, including calculating bc by calculating the number of seconds, n, required to fill a buffer using the following equation:

$$n_s = \frac{d_f}{m_k} \cdot \frac{m_s}{60}.$$

In this equation, $d_f$ is a current free disk space total in kB, $m_k$, denotes an average message size in kB, and $m_s$, denotes a current message per second rate as determined from a data processing pipeline. A buffer congestion level, bc[n], is calculated using the following equation:

$$bc[n] = \begin{cases} 1, & \text{if } dp \geq p_{thresh} \\ bc_n, & \text{if } dp \leq p_{thresh} \end{cases}.$$

In this equation, dp denotes a free disk space percentage on the cloud components, $p_{thresh}$ is a configurable free disk space threshold, e.g. 50%. The term $bc_n$ is calculated using the following equation:

$$bc_n = \frac{n_s}{n_{max}}, \text{ wherein: } n_{max} = \frac{d_{max}}{m_k} \cdot \frac{m_s}{60}.$$

and $d_{max}$ denotes the maximum disk space available to the system.

Example 16 includes the subject matter of any of Examples 8 to 15, including setting c to a lowest value determined for a component in a data processing pipeline.

Example 17 includes the subject matter of any of Examples 8 to 16, including generating an alert message including c.

Example 18 includes the subject matter of any of Examples 8 to 17, including generating a java script object notation (JSON) message including c.

Example 19 includes the subject matter of any of Examples 8 to 18, including sending the alert message to the IoT device.

Example 20 includes the subject matter of any of Examples 8 to 19, including storing the alert message for access by the IoT device.

Example 21 provides a non-transitory, computer readable medium including code to direct a processor to send out tracer messages to a plurality of components in a cloud, monitor for response messages from the plurality of components, store received response messages in a storage system, and query the response messages to determine network conditions in the cloud. Code is included to direct the processor to create an alert message to report network conditions to an internet of things (IoT) device.

Example 22 includes the subject matter of Example 21, including code to direct a processor to identify that a component has failed by a missing response message.

Example 23 includes the subject matter of either of Examples 21 or 22, including code to direct a processor to calculate a congestion level, c, as a number between 0 and 1, wherein a lower value for c represents a slower transfer of data in the cloud, wherein c is set as a lower value of a throughput congestion level, tc, or a buffer congestion level, bc.

Example 24 includes the subject matter of any of Examples 21 to 23, including code to direct a processor to calculate tc for a component as a ratio of a current time for a response divided by a baseline time for the response from the component.

Example 25 includes the subject matter of any of Examples 21 to 24, including code to direct a processor to calculate bc from an amount of free disk space, a message rate, a size of messages, or a number of seconds required to fill a buffer, or any combinations thereof.

Example 26 provides an apparatus for managing communication congestion for internet of things (IoT) devices, including a pipeline processing application, wherein the pipeline processing application is configured to: send tracer messages to each of a plurality of components in a cloud; determine a congestion level, c, by time differences between responses and the tracer messages; and generate backpressure alert messages for an IoT device.

Example 27 includes the subject matter of Example 26, wherein the responses include forwarded tracer messages.

Example 28 includes the subject matter of either of Examples 26 or 27, including an IoT device. The IoT device includes a data transfer controller configured to dispatch messages to the pipeline processing application in the cloud and a backpressure monitor configured to accept the backpressure alert messages and adjust a dispatch of messages from the data transfer controller.

Example 29 includes the subject matter of any of Examples 26 to 28, wherein the IoT device includes an IoT gateway coupled to a plurality of IoT devices and wherein the IoT gateway is configured to pass messages from the plurality of IoT devices to the pipeline processing application.

Example 30 includes the subject matter of any of Examples 26 to 29, including a data router in the cloud interfaced to an IoT device, wherein the data router is configured to send backpressure alert messages to the IoT device.

Example 31 includes the subject matter of any of Examples 26 to 30, including a storage device, wherein the storage device includes a store of responses to the tracer messages, and wherein the store of responses is queried to determine time differences between messages.

Example 32 provides an apparatus for managing communication congestion for internet of things (IoT) devices, including a pipeline processing application, wherein the pipeline processing application includes a means for determining a congestion level, c, in a cloud.

Example 33 includes the subject matter of Example 32, including an IoT device, including means for adjusting a dispatch of messages based, at least in part, on the congestion level.

Example 34 includes the subject matter of Examples 32 or 33, wherein the IoT device includes means for passing messages from a plurality of IoT devices to the pipeline processing application.

Example 35 includes the subject matter of any of Examples 32 to 34, wherein the pipeline processing application comprises means for sending backpressure alert messages to the IoT device.

Example 36 provides an apparatus for managing communication congestion for internet of things (IoT) devices. The apparatus includes an IoT device that includes a data transfer controller configured to create sensor messages and dispatch the sensor messages to a pipeline processing application in a cloud. The IoT device includes a backpressure monitor configured to accept backpressure alert messages, wherein the backpressure monitor is configured to adjust a rate of dispatch of sensor messages from the data transfer controller, a polling interval for polling a sensor, or both. A data store is configured to buffer messages that cannot be sent due to communication issues.

Example 37 includes the subject matter of Example 36, wherein the backpressure alert messages include a congestion level, c.

Example 38 includes the subject matter of either of Examples 36 or 37, wherein the IoT device includes an IoT gateway coupled to a number of IoT devices and wherein the IoT gateway is configured to pass messages from the number of IoT devices to the pipeline processing application.

Example 39 includes the subject matter of any of Examples 36 to 38, wherein the IoT device includes an IoT gateway coupled to a number of sensors.

Example 40 includes the subject matter of any of Examples 36 to 39, wherein the backpressure monitor is configured to calculate the polling interval.

Example 41 includes the subject matter of any of Examples 36 to 40, wherein the backpressure monitor is configured to calculate a replay rate.

Example 42 provides a method for controlling an internet of things (IoT) device based on a congestion level, c. The method includes polling a sensor, writing a measurement to a file, parsing the file to create a message, and checking for a backpressure alert message. If a backpressure alert message is found the message is saved to a cache and a polling interval is changed.

Example 43 includes the subject matter of Example 42, including initializing a polling interval, as a maximum value of a current rate, r, or a backpressure rate, b.

Example 44 includes the subject matter of any of Examples 42 or 43, including if the backpressure alert message is not found, dispatching the message to a consumer, and determining if the dispatch was successful. If the dispatch was successful the file is moved to a processed directory.

Example 45 includes the subject matter of any of Examples 42 to 44, including if the dispatch was not successful, saving the message to a cache.

Example 46 includes the subject matter of any of Examples 42 to 45, including calculating a new polling interval, $p_i$, using the following equation:

$$p_i = \begin{cases} 1, & \text{if } p_i \geq 1 \\ \dfrac{m_k}{d} \cdot r \cdot b, & \text{otherwise} \end{cases}.$$

In this equation, $m_k$ denotes a message size expressed in kB, d denotes an amount of free disk space on an edge device expressed in kB, r denotes a current messaging rate, and b denotes a backpressure rate.

Example 47 includes the subject matter of any of Examples 42 to 46, including replaying the message from the cache. Replaying the message includes checking if a backpressure alert is present at the IoT device, and, if not, requesting the backpressure alert message from a cloud. A replay rate, r, is calculated. If the replay rate is zero, then iterating checking for the backpressure alert.

Example 48 includes the subject matter of any of Examples 42 to 47, including calculating an updated replay rate by the following equation:

$$r'=r*f.$$

In this equation, r' denotes the updated replay rate and f denotes a message dispatch frequency. The replay rate is replaced with the updated replay rate.

Example 49 includes the subject matter of any of Examples 42 to 48, wherein f is once per minute.

Example 50 includes the subject matter of any of Examples 42 to 49, including, if the replay rate is greater than zero, selecting the message from the cache, and dispatching the message to the cloud.

Example 51 includes the subject matter of any of Examples 42 to 50, including checking if the cache is empty, and, if not, replaying the message from the cache.

Example 52 provides a non-transitory, computer readable medium including instructions to direct a processor to check for network congestion, adjust a replay rate, and dispatch a message to a cloud.

Example 53 includes the subject matter of Example 52, including instructions to direct the processor to adjust a polling interval.

Example 54 includes the subject matter of any of Example 52 or 53, including instructions to direct the processor to replay messages from a queue.

Example 55 includes the subject matter of any of Example 52 to 54, including instructions to direct the processor to request a backpressure alert message.

Example 56 includes the subject matter of any of Example 52 to 55, including instructions to direct the processor to create the message.

Example 57 provides an internet of things (IoT) device for managing communication congestion, including a data transfer controller configured to create sensor messages and dispatch the sensor messages to a pipeline processing application in a cloud. The IoT device includes a backpressure monitor configured to accept backpressure alert messages, wherein the backpressure monitor is configured to adjust a rate of dispatch of sensor messages from the data transfer controller, a polling interval for polling a sensor, or both. The IoT devices also includes a data store configured to buffer messages that cannot be sent due to communication issues.

Example 58 includes the subject matter of Example 57, wherein the backpressure alert messages include a congestion level, c.

Example 59 includes the subject matter of any of Examples 57 or 58, wherein the backpressure monitor is configured to calculate the polling interval.

Example 60 includes the subject matter of any of Examples 57 to 59, wherein the backpressure monitor is configured to calculate a replay rate.

Example 61 provides an apparatus for managing communication congestion for internet of things (IoT) devices, including a means for adjusting a rate of dispatch of sensor messages from the IoT device, a polling interval for polling a sensor, or both.

Example 62 includes the subject matter of Example 61, including a means for calculating a congestion level, c.

Example 63 includes the subject matter of any of Examples 61 or 62, including a means for calculating a polling interval.

Example 64 includes the subject matter of any of Examples 61 to 63, including a means for calculating a replay rate.

Example 65 provides an apparatus for managing communication congestion for internet of things (IoT) devices, including an IoT device that includes a data transfer controller configured to create a sensor message and dispatch the sensor message to a pipeline processing application in a cloud. The IoT device includes a data store configured to store the sensor message in a cache if it cannot be sent due to communication issues, and a data backlog transfer controller configured to send the sensor message from the data store.

Example 66 includes the subject matter of Examples 65, wherein the data backlog transfer controller is configured to send the sensor message from the cache using a first in-first out mode, a last in-first out mode, or a sampled mode.

Example 67 includes the subject matter of either of Examples 65 or 66, wherein the data backlog transfer controller is configured to accept control messages that change a mode for sending the sensor message.

Example 68 includes the subject matter of any of Examples 65 to 67, wherein the IoT device includes an IoT gateway coupled to a number of IoT devices and wherein the IoT gateway is configured to send sensor messages from the number of IoT devices to the pipeline processing application.

Example 69 includes the subject matter of any of Examples 65 to 68, wherein the IoT device includes an IoT gateway coupled to a number of sensors.

Example 70 includes the subject matter of any of Examples 65 to 69, including a backpressure monitor configured to accept backpressure alert messages, wherein the backpressure monitor is configured to adjust a rate of dispatch of sensor messages from the cache.

Example 71 provides a method for controlling communications from an internet of things (IoT) device. The method includes dispatching a message to a data processing application in a cloud using a selected mode for selecting the message from a cache, and checking for a request from the cloud to change the mode.

Example 72 includes the subject matter of Examples 71, wherein, if the request is received, the request to change the mode is parsed. A determination is made as to whether the request is to change to a last in-first out (LIFO) mode, and, if so, configuring the LIFO mode. A determination is made as to whether the request is to change to a sampled mode, and, if so, configuring the sampled mode. A determination is made as to whether the request is to change to change to a first in-first out (FIFO) mode, and, if so, configuring the FIFO mode.

Example 73 includes the subject matter of either of Examples 71 or 72, including dispatching the message using a LIFO mode. Dispatching the message using the LIFO mode includes selecting the message from a queue, wherein the message is a last message added to the queue. The message is dispatched to a consumer and it is determined as to whether the dispatch was successful. If so, the message is deleted from the queue.

Example 74 includes the subject matter of any of Examples 71 to 73, including dispatching the message using a FIFO mode. Dispatching the message using the FIFO mode includes selecting the message from a queue, wherein the message is a first message added to the queue. The message is dispatched to a consumer and it is determined as to whether the dispatch was successful. If so, the message is deleted from the queue.

Example 75 includes the subject matter of any of Examples 71 to 74, including dispatching the message using a sampled mode. Dispatching the message using the sampled mode includes selecting the message from a queue, wherein the message is randomly selected from the queue. The message is dispatched to a consumer and it is determined as to whether the dispatch was successful. If so, the message is deleted from the queue.

Example 76 includes the subject matter of any of Examples 71 to 75, wherein dispatching the message, includes checking if a backpressure alert is present at an IoT device. If a backpressure alert is not present, a backpressure alert message is requested from a cloud component. A replay rate, r, is calculated, and if the replay rate is zero, then iterating checking for the backpressure alert.

Example 77 includes the subject matter of any of Examples 71 to 76, including calculating an updated replay rate by the following equation:

$$r'=r*f.$$

In this equation, r' denotes the updated replay rate and f denotes a message dispatch frequency; and replacing a current replay rate with the updated replay rate.

Example 78 includes the subject matter of any of Examples 71 to 77, wherein f is once per minute.

Example 79 includes the subject matter of any of Examples 71 to 78, including checking if a queue is empty, and, if not, selecting another sensor message from the queue.

Example 80 provides a non-transitory, computer readable medium including instructions to direct a processor to adjust a replay mode, wherein the replay mode is selected from a last in-first out (LIFO) mode, a first in-first out (FIFO) mode, or a sampled mode. Instructions are included to direct a processor to adjust a replay rate, select a message from a queue using the replay mode, and dispatch the message to a cloud.

Example 81 includes the subject matter of Example 80, including instructions to direct the processor to request a backpressure alert message.

Example 82 includes the subject matter of either of Examples 80 or 81, including instructions to direct the processor to adjust the replay rate based, at least in part, on the backpressure alert message.

Example 83 includes the subject matter of any of Examples 80 to 82, including instructions to determine if the message has been successfully dispatched, and, if so, delete the message from the queue.

Example 84 includes the subject matter of any of Examples 80 to 83, including instructions to direct the processor to create the message.

Example 85 provides an internet of things (IoT) device for managing communication congestion. The IoT device includes a data transfer controller configured to create a sensor message and dispatch the sensor message to a pipeline processing application in a cloud. A data store is configured to store the sensor message in a cache if it cannot be sent due to communication issues. A data backlog transfer controller is configured to send the sensor message from the data store when the communications issues are not present.

Example 86 includes the subject matter of Example 85, wherein the data backlog transfer controller is configured to send the sensor message from the cache using a first in-first out mode, a last in-first out mode, or a sampled mode.

Example 87 includes the subject matter of either of Examples 85 or 86, wherein the data backlog transfer controller is configured to accept control messages that change a mode for sending the sensor message.

Example 88 includes the subject matter of any of Examples 85 to 87, including an IoT gateway coupled to a number of IoT devices and wherein the IoT gateway is configured to send sensor messages from the number of IoT devices to the pipeline processing application.

Example 89 includes the subject matter of any of Examples 85 to 88, including an IoT gateway coupled to a number of sensors.

Example 90 includes the subject matter of any of Examples 85 to 89, including a backpressure monitor configured to accept backpressure alert messages, wherein the backpressure monitor is configured to adjust a rate of dispatch of sensor messages from the cache.

Example 91 provides an apparatus for managing communication congestion for internet of things (IoT) devices, including a means for sending a backlogged message from a cache.

Example 92 includes the subject matter of Example 91, including a means for sending the sensor message using a first in-first out mode, a last in-first out mode, or a sampled mode.

Example 93 includes the subject matter of either of Examples 91 or 92, including a means for changing a mode for sending the sensor message.

Example 94 includes the subject matter of any of Examples 91 to 93, including a means for adjusting a rate of dispatch of messages from the cache.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for managing communication congestion for internet of things (IoT) devices coupled to a cloud, the apparatus comprising:
    an IoT device, comprising:
        a plurality of sensors, each sensor to generate data;
        a data transfer controller configured to:
            create sensor messages based on the generated data; and
            dispatch the sensor messages to a pipeline processing application in the cloud;
        a backpressure monitor configured to:
            determine congestion in the cloud by sending a tracer message to each component in the cloud, the tracer message being a message whose contents and frequency of dispatch are known, the tracer message to be followed by a response message, wherein either no response or a time-delayed response message indicates congestion; and
            accept backpressure alert messages as a result of congestion being detected by the cloud or other IoT devices;
        wherein the backpressure monitor is configured to adjust a rate of dispatch of sensor messages from the data transfer controller, a polling interval for polling the plurality of sensors, or both;
        a data store configured to buffer sensor messages that cannot be sent due to the congestion; and
        a data backlog transfer controller to incrementally transfer sensor messages from the data store, at a replay rate specified by the backpressure monitor, once congestion is abated.

2. The apparatus of claim 1, wherein the data store comprises a first capacity and the cloud comprises non-volatile storage of a second capacity, wherein the first capacity is greater than the second capacity.

3. The apparatus of claim 1 wherein the IoT device comprises an IoT gateway coupled to a plurality of IoT devices and wherein the IoT gateway is configured to pass sensor messages from the plurality of IoT devices to the pipeline processing application.

4. The apparatus of claim 3, the IoT gateway to allocate a memory to implement a virtual machine, wherein the data transfer controller, the backpressure monitor, and the data store are functional units within the virtual machine.

5. The apparatus of claim 1, wherein the incremental transfer of sensor messages to the data store is implemented using a technique, wherein the technique is selected from a group consisting of first-in-first-out, last-in-first-out, and random sampling.

6. A method for controlling an internet of things (IoT) device in communication with a cloud based on a congestion level, c, of one or more components of the cloud, the method comprising:
    polling a sensor coupled to the IoT device according to a polling interval, resulting in a sensor measurement;
    writing the sensor measurement to a file in an IoT device storage device;
    parsing the file to create a message, the message being associated with the sensor measurement, wherein the message is intended to be dispatched to a cloud storage device; and
    checking for a backpressure alert message being sent from the cloud, and, if found:
        saving the message to a cache memory of the IoT device; and
        changing the polling interval using the following equation:

$$p_i = \begin{cases} 1, & \text{if } p_i \geq 1 \\ \dfrac{m_k}{d} \cdot r \cdot b, & \text{otherwise} \end{cases},$$

wherein $p_i$ denotes the changed polling interval, $m_k$ denotes a message size expressed in kB, d denotes an amount of free disk space on the IoT device expressed in kB, r denotes a current messaging rate, and b denotes a backpressure rate;
wherein the message is not dispatched to the cloud storage device until the congestion level of the cloud is diminished.

7. The method of claim 6, further comprising if the backpressure alert message is not found:
    dispatching the message to the cloud storage device; and
    determining if the dispatch was successful, and, if so, moving the file to a processed directory in the IoT storage device.

8. The method of claim 7, further comprising if the dispatch was not successful, saving the message to the cache memory of the IoT device.

9. The method of claim 7, further comprising:
    replaying the message from the cache memory of the IoT device by:
    checking if a backpressure alert is present at the IoT device, and, if not, requesting the backpressure alert message from the cloud;
    calculating a replay rate, r; and
    if the replay rate is zero, then iterating checking for the backpressure alert.

10. The method of claim 9, further comprising:
    calculating an updated replay rate by the following equation:

$$r' = r * f,$$

wherein r' denotes the updated replay rate and f denotes a message dispatch frequency; and
    replacing the replay rate with the updated replay rate.

11. The method of claim 10, wherein f is once per minute.

12. The method of claim 9, further comprising, if the replay rate is greater than zero:
- selecting the message from the cache memory of the IoT device; and
- dispatching the message to the cloud storage device.

13. The method of claim 12, further comprising checking if the cache memory of the IoT device is empty, and, if not, replaying the message from the cache memory of the IoT device.

14. A non-transitory, computer readable medium comprising instructions to direct a processor to:
- check for network congestion by an Internet of Things (IoT) gateway coupled to a cloud, wherein the IoT gateway gathers data from sensors coupled to the IoT gateway, generates messages based on the gathered data, and stores the messages in a local memory cache of the IoT gateway;
- receive a backpressure alert from the cloud;
- adjust a replay rate of messages stored in the local memory cache of the IoT gateway;
- dispatch a message of the cached messages to the cloud once the backpressure alert is no longer received from the cloud; and
- adjust a polling interval, $p_i$, of gathering data from sensors using the following equation:

$$p_i = \begin{cases} 1, & \text{if } p_i \geq 1 \\ \frac{m_k}{d} \cdot r \cdot b, & \text{otherwise} \end{cases},$$

wherein $m_k$ denotes a message size expressed in kB, d denotes an amount of free disk space on the IoT gateway expressed in kB, r denotes a current messaging rate, and b denotes a backpressure rate;

wherein the messages gathered at the adjusted polling interval are sent directly to the cloud without being stored in the memory cache of the IoT gateway if there is no backpressure alert from the cloud.

15. The non-transitory, computer readable medium of claim 14, further comprising instructions to direct the processor to:
- request a backpressure alert message from the cloud; and
- replay messages stored in the local memory cache of the IoT gateway if no backpressure alert is received.

16. The non-transitory, computer readable medium of claim 15, further comprising instructions to direct the processor to:

replay messages according to one of the following techniques:
- first-in-first-out;
- last-in-first-out; and
- random sampling.

17. An internet of things (IoT) device for managing communication congestion, comprising: a processor to execute modules loaded into a memory, the modules comprising:
- a data transfer controller configured to create sensor messages and dispatch the sensor messages to a pipeline processing application in a cloud; a backpressure monitor configured to accept backpressure alert messages, wherein the backpressure monitor is configured to adjust a rate of dispatch of sensor messages from the data transfer controller, a polling interval for polling a sensor, or both;
- a data store configured to buffer messages that cannot be sent due to the congestion; and
- a data backlog transfer controller to incrementally transfer sensor messages from the data store, at a replay rate specified by the backpressure monitor, once congestion is abated;
- a data backlog transfer controller to incrementally transfer buffered messages from the data store, at a replay rate calculated by the backpressure monitor;
- wherein the messages are buffered locally to avoid overload of cloud storage.

18. The IoT device of claim 17, wherein the data backlog transfer controller implements a means to incrementally transfer buffered messages from the data store, wherein the means is selected from a group consisting of first-in-first-out, last-in-first-out, and random sampling.

19. The IoT device of claim 17, wherein the backpressure monitor is configured to use the following equation to adjust the polling interval, $p_i$:

$$p_i = \begin{cases} 1, & \text{if } p_i \geq 1 \\ \frac{m_k}{d} \cdot r \cdot b, & \text{otherwise} \end{cases},$$

wherein $m_k$ denotes a message size expressed in kB, d denotes an amount of free disk space on the data store of the IoT device expressed in kB, r denotes a current messaging rate, and b denotes a backpressure rate.

* * * * *